(12) United States Patent
Koga et al.

(10) Patent No.: US 11,955,857 B2
(45) Date of Patent: Apr. 9, 2024

(54) ARMATURE

(71) Applicant: AISIN CORPORATION, Kariya (JP)

(72) Inventors: Kiyotaka Koga, Nishio (JP); Takahiro Kobuchi, Kariya (JP)

(73) Assignee: AISIN CORPORATION, Kariya (JP)

( * ) Notice: Subject to any disclaimer, the term of this patent is extended or adjusted under 35 U.S.C. 154(b) by 701 days.

(21) Appl. No.: 15/734,405

(22) PCT Filed: Jun. 28, 2019

(86) PCT No.: PCT/JP2019/025938
§ 371 (c)(1),
(2) Date: Dec. 2, 2020

(87) PCT Pub. No.: WO2020/026668
PCT Pub. Date: Feb. 6, 2020

(65) Prior Publication Data
US 2021/0167657 A1    Jun. 3, 2021

(30) Foreign Application Priority Data
Jul. 31, 2018 (JP) ................................. 2018-144296

(51) Int. Cl.
H02K 3/34 (2006.01)
H02K 3/12 (2006.01)

(52) U.S. Cl.
CPC ............ *H02K 3/345* (2013.01); *H02K 3/12* (2013.01)

(58) Field of Classification Search
CPC .. H02K 3/12; H02K 3/28; H02K 3/34; H02K 3/345; H02K 3/50
See application file for complete search history.

(56) References Cited

U.S. PATENT DOCUMENTS

| 8,446,061 B2* | 5/2013 | Nakayama ............... H02K 3/34 310/214 |
| 10,601,275 B2 | 3/2020 | Kawanishi |
| 2015/0263578 A1 | 9/2015 | Hayslett et al. |
| 2016/0172919 A1* | 6/2016 | Hattori ..................... H02K 3/48 29/596 |

(Continued)

FOREIGN PATENT DOCUMENTS

| CN | 108134467 A | 6/2018 |
| EP | 3 327 903 A1 | 5/2018 |
| JP | S52-37253 U | 3/1977 |

(Continued)

OTHER PUBLICATIONS

Oct. 1, 2019 Search Report issued in International Patent Application No. PCT/JP2019/025938.

(Continued)

*Primary Examiner* — Dang D Le
(74) *Attorney, Agent, or Firm* — Oliff PLC

(57) ABSTRACT

In this armature, a joint portion is insulated by a joint portion insulating member that has a sheet shape and that includes a facing surface insulating part that covers a facing surface of the joint portion and a circumferential surface insulating part that covers a circumferential surface of the joint portion. The facing surface insulating parts adjacent to each other in a radial direction are connected by the circumferential surface insulating part on one side or another side in the circumferential direction.

12 Claims, 27 Drawing Sheets

(56) References Cited

U.S. PATENT DOCUMENTS

2017/0040859 A1* 2/2017 Langlard .................. H02K 3/28
2018/0159395 A1   6/2018 Kawanishi

FOREIGN PATENT DOCUMENTS

| JP | S56-161955 U  | 12/1981 |
|----|---------------|---------|
| JP | 2006-141076 A | 6/2006  |
| JP | 2006-158044 A | 6/2006  |
| JP | 2009-195009 A | 8/2009  |
| JP | 2011-223685 A | 11/2011 |
| JP | 2013-9499 A   | 1/2013  |

OTHER PUBLICATIONS

Jul. 22, 2021 Extended Search Report issued in European Patent Application No. 19845044.7.

* cited by examiner

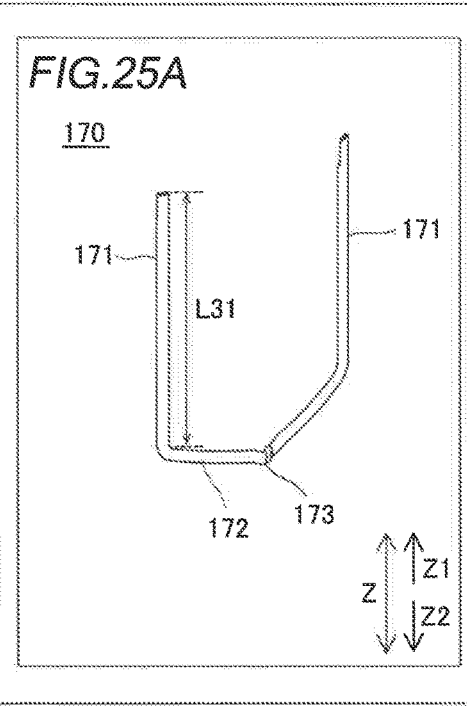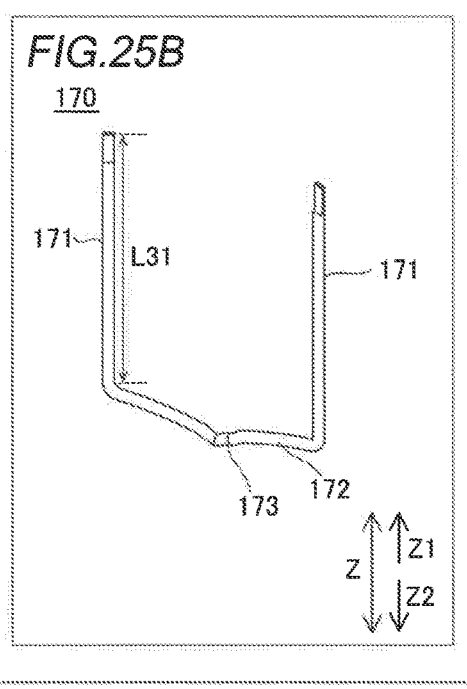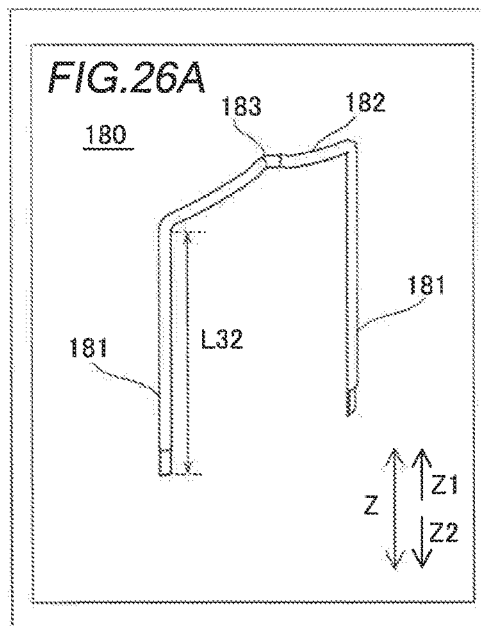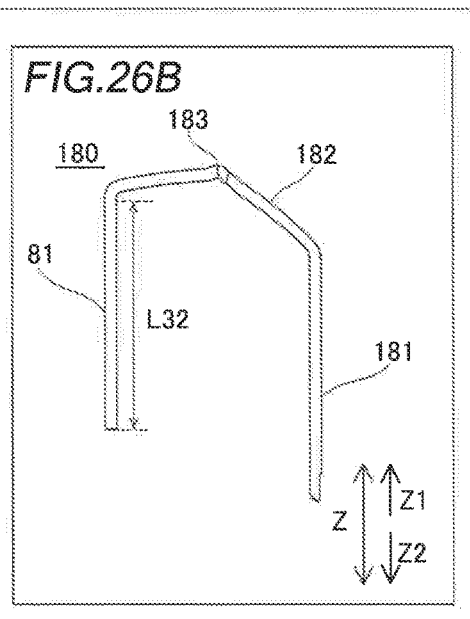

ARMATURE

TECHNICAL FIELD

The present disclosure relates to an armature.

BACKGROUND ART

Conventionally, an armature including an armature core provided with a plurality of slots extending in a central axis direction is known. Such an armature is disclosed, for example, in Japanese Unexamined Patent Application Publication No. 2006-141076 (JP 2006-141076 A).

JP 2006-141076 A discloses a rotary electric machine stator (hereinafter, referred to as a "stator") having a stator core provided with a plurality of slots extending in a central axis direction (axial direction). A coil is disposed in the slots of the stator. The coil is divided into three parts. Specifically, the coil is configured of one linear portion conductor segment that has a linear shape and two coil end portion conductor segments that have a substantially U-shape (or a substantially V-shape).

Further, in JP 2006-141076 A, an insulating insulator is disposed in each of the slots. The insulating insulator is made of resin. Further, the insulating insulator is provided with an insertion hole into which the linear portion conductor segment is inserted. A plurality of insertion holes is provided in one insulating insulator. The linear portion conductor segment and the coil end portion conductor segment are joined inside the insertion hole of the insulating insulator. In addition, since the linear portion conductor segment is inserted in each of the insertion holes, the linear portion conductor segments are insulated from each other (and the joint portions between the linear portion conductor segment and the coil end portion conductor segment are insulated from each other).

RELATED ART DOCUMENTS

Patent Documents

Patent Document 1: Japanese Unexamined Patent Application Publication No. 2006-141076 (JP 2006-141076 A)

SUMMARY OF THE DISCLOSURE

Problem to be Solved by the Disclosure

However, in the armature of JP 2006-141076 A, since the insulating insulator for insulating the joint portions between the linear portion conductor segment and the coil end portion conductor segment from each other are made of resin, the insulating insulator (insulating member) is relatively difficult to be formed.

The present disclosure has been made to solve the above problem, and an object of the present disclosure is to provide an armature that can insulate joint portions from each other with an insulating member that can be easily formed.

Means for Solving the Problem

In order to achieve the object described above, an armature of a first aspect of the disclosure includes: an armature core provided with a plurality of slots extending in a central axis direction; and a coil portion that includes a plurality of first segment conductors disposed on one side of the armature core in the central axis direction, and a plurality of second segment conductors disposed on another side of the armature core in the central axis direction so as to face the first segment conductors in the central axis direction, and that is formed by joining the plurality of first segment conductors and the plurality of second segment conductors, in one slot of the slots or on an outer side of the one slot in the central axis direction; and a joint portion insulating member that has a sheet shape and that insulates joint portions in which the first segment conductor and the second segment conductor are joined between coils adjacent to each other in a radial direction in the one slot, in which the joint portion insulating member includes at least two or more facing surface insulating parts that cover facing surfaces of the joint portions being radially adjacent to each other, and a circumferential surface insulating part that is continuous from both end portions of the facing surface insulating parts in a circumferential direction and that covers one circumferential surface of the joint portions adjacent in the radial direction for at least a predetermined distance along the radial direction, and the facing surface insulating parts adjacent in the radial direction are connected by the circumferential surface insulating part in one or another circumferential direction.

In the armature according to the first aspect of the present disclosure, as described above, since the joint portion insulating member that insulates the joint portions from each other has a sheet shape, it is possible to easily form the joint portion insulating member by bending the insulating member that has a sheet shape. As a result, the joint portions can be insulated from each other by the joint portion insulating member that can be easily formed. The joint portion insulating member includes the facing surface insulating part that covers the facing surfaces of the joint portions adjacent in the radial direction, and the circumferential surface insulating part that is continuous from both end portions of the facing surface insulating part in the circumferential direction and that covers one of the joint portions adjacent in the radial direction for at least the predetermined distance. Thus, the joint portions adjacent in the radial direction are insulated by the joint portion insulating member. Further, since the facing surface insulating parts adjacent to each other in the radial direction are connected to each other by the circumferential surface insulating part in one or the other of the circumferential directions, the joint portion insulating member can be easily expanded and contracted in the radial direction, unlike the case in which the facing surface insulating parts adjacent in the radial direction are connected by the circumferential surface insulating part in both circumferential directions. Further, since the joint portion insulating member has a relatively thin sheet shape, a space factor of the coil portion in the slot can be increased. The term "joint portion" has a broad meaning including not only a portion joined with a bonding agent but also a portion that is only in contact without a bonding agent.

An armature of a second aspect of the disclosure includes: an armature core provided with a plurality of slots extending in a central axis direction; and a coil portion that includes a plurality of first segment conductors disposed on one side of the armature core in the central axis direction, and a plurality of second segment conductors disposed on another side of the armature core in the central axis direction so as to face the first segment conductors in the central axis direction, and that is formed by joining the plurality of first segment conductors and the plurality of second segment conductors, in one slot of the slots or on an outer side of the one slot in the central axis direction; and a joint portion insulating member that has a sheet shape and that insulates joint portions in which the first segment conductor and the second segment conductor are joined between coils adjacent to each other in a radial direction in the one slot, in which the joint portion insulating member includes a facing surface insulating part that covers facing surfaces of the joint portions being radially adjacent to each other, and a circumferential surface insulating part that is continuous from both end portions of the facing surface insulating part in a circumferential direction and that covers one circumferential surface of the joint portions adjacent in the radial direction for at least an insulation distance, and the facing surface insulating parts adjacent in the radial direction are connected by the circumferential surface insulating part in one or another circumferential direction.

In the armature according to the second aspect of the present disclosure, as described above, since the joint portion insulating member that insulates the joining portions from each other has a sheet shape, it is possible to easily form the joint portion insulating member by bending the insulating member that has a sheet shape. As a result, the joint portions can be insulated from each other by the joint portion insulating member that can be easily formed. The joint portion insulating member includes the facing surface insulating part that covers the facing surfaces of the joint portions adjacent in the radial direction, and the circumferential surface insulating part that is continuous from both end portions of the facing surface insulating part in the circumferential direction and that covers one of the joint portions adjacent in the radial direction for at least the insulation distance. Thus, the joint portions adjacent in the radial direction are insulated by the joint portion insulating member. Further, since the facing surface insulating parts adjacent to each other in the radial direction are connected to each other by the circumferential surface insulating part in one or the other of the circumferential directions, the joint portion insulating member can be easily expanded and contracted in the radial direction, unlike the case in which the facing surface insulating parts adjacent in the radial direction are connected by the circumferential surface insulating part in both circumferential directions. Further, since the joint portion insulating member has a relatively thin sheet shape, a space factor of the coil portion in the slot can be increased.

Effects of the Disclosure

According to the present disclosure, as described above, the joint portions can be insulated from each other by the insulating member that can be easily formed.

BRIEF DESCRIPTION OF THE DRAWINGS

FIG. 24 is a cross-sectional view showing a configuration of a segment conductor according to the second embodiment.

FIG. 25 is a perspective view showing a configuration of a first segment conductor according to the second embodiment. (FIG. 25A is a perspective view of the first segment conductor when viewed from an outer radial side. FIG. 25B is a perspective view of the first segment conductor when viewed from an inner radial side.)

FIG. 26 is a perspective view showing a configuration of a second segment conductor according to the second embodiment. (FIG. 26A is a perspective view of the second segment conductor when viewed from an outer radial side. FIG. 26B is a perspective view of the second segment conductor when viewed from an inner radial side.)

MODES FOR CARRYING OUT THE DISCLOSURE

Hereinafter, a first embodiment of the present disclosure will be described with reference to the drawings.

First Embodiment

Structure of Stator

The structure of a stator 100 according to the first embodiment will be described with reference to FIGS. 1 to 21. The stator 100 has an annular shape centered around a central axis C1. The stator 100 is an example of an "armature" in the claims.

Figure 1:
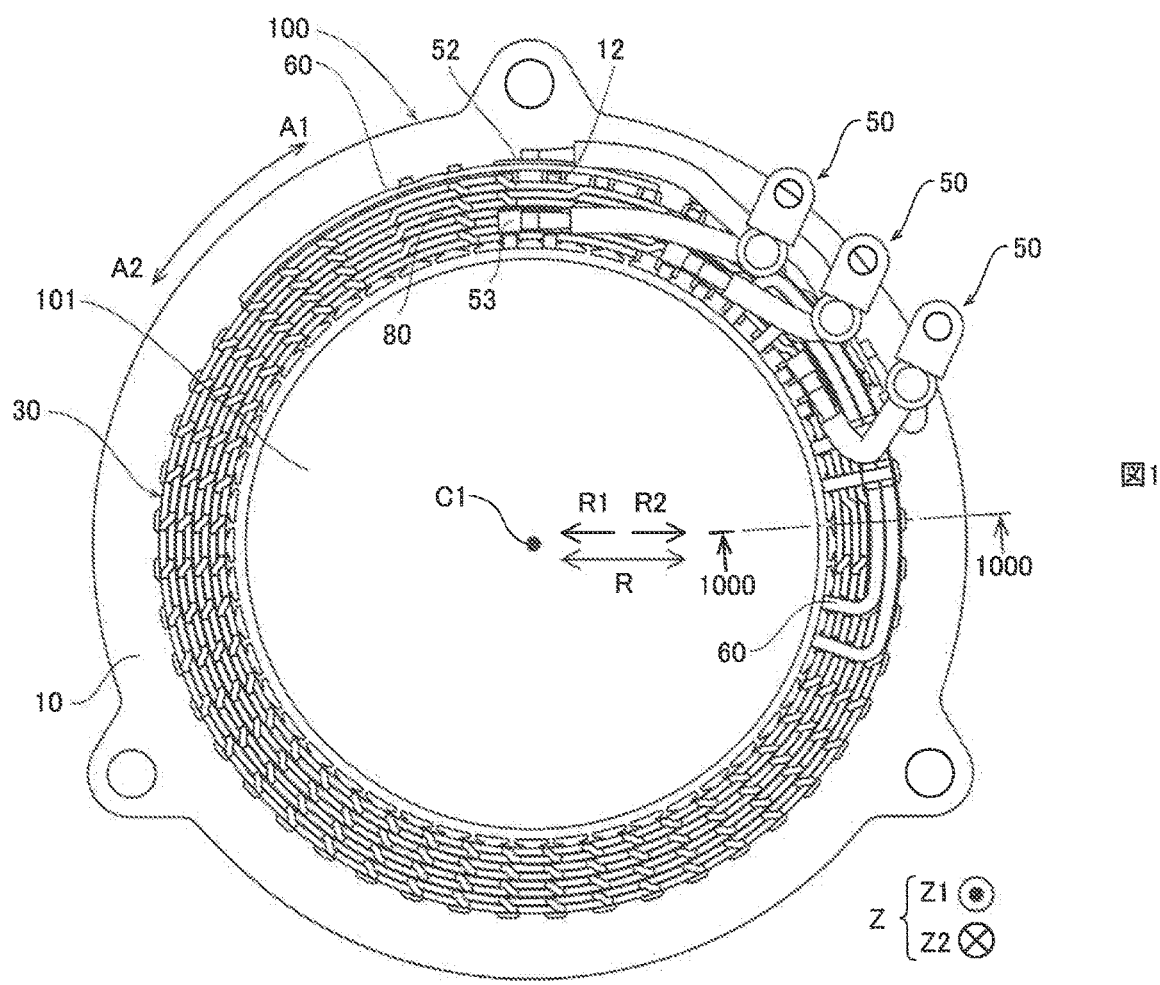
FIG. 1 is a plan view showing a configuration of a stator (rotary electric machine) according to a first embodiment.

In the specification of the application, an "axial direction (central axis direction, axis direction)" means a direction (Z direction) along the central axis C1 of the stator 100 (a rotational axis of a rotor 101) as shown in FIG. 1. A "circumferential direction" means a circumferential direction (A1 direction, A2 direction) of the stator 100. A "radial direction" means a radial direction (R direction) of the stator 100. An "inner radial side" means a direction (R1 direction) toward the central axis C1 of the stator 100 along the radial direction. Further, an "outer radial side" means a direction (R2 direction) toward the outside of the stator 100 along the radial direction.

The stator 100 configures a part of a rotary electric machine 102 together with the rotor 101. The rotary electric machine 102 is configured as a motor, a generator, or a motor/generator, for example. As shown in FIG. 1, the stator 100 is disposed on the outer radial side the rotor 101 in which a permanent magnet (not shown) is provided. That is, in the first embodiment, the stator 100 configures a part of the inner rotor type rotary electric machine 102.

Figure 2:
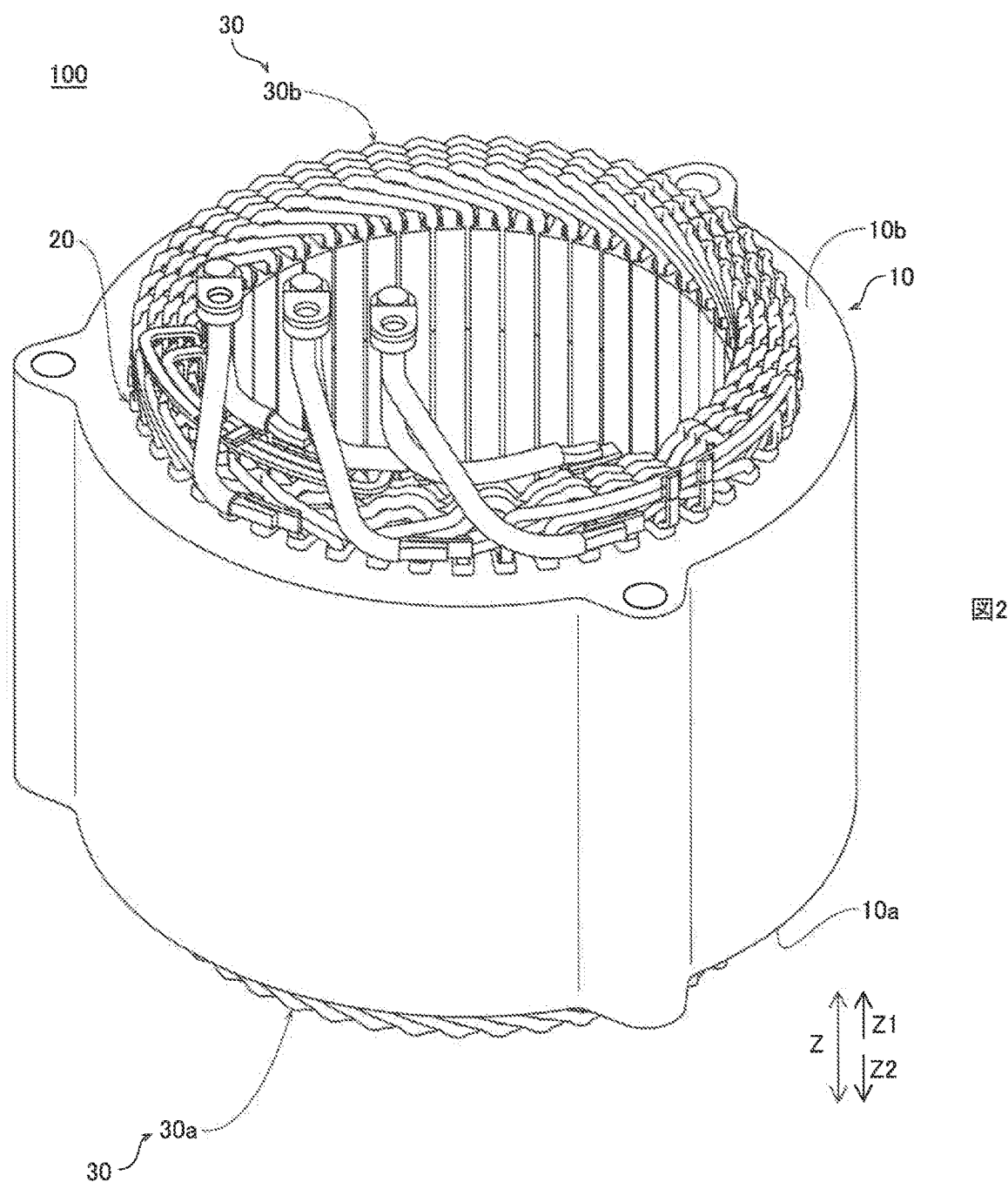
FIG. 2 is a perspective view showing the configuration of the stator according to the first embodiment.
Figure 3:
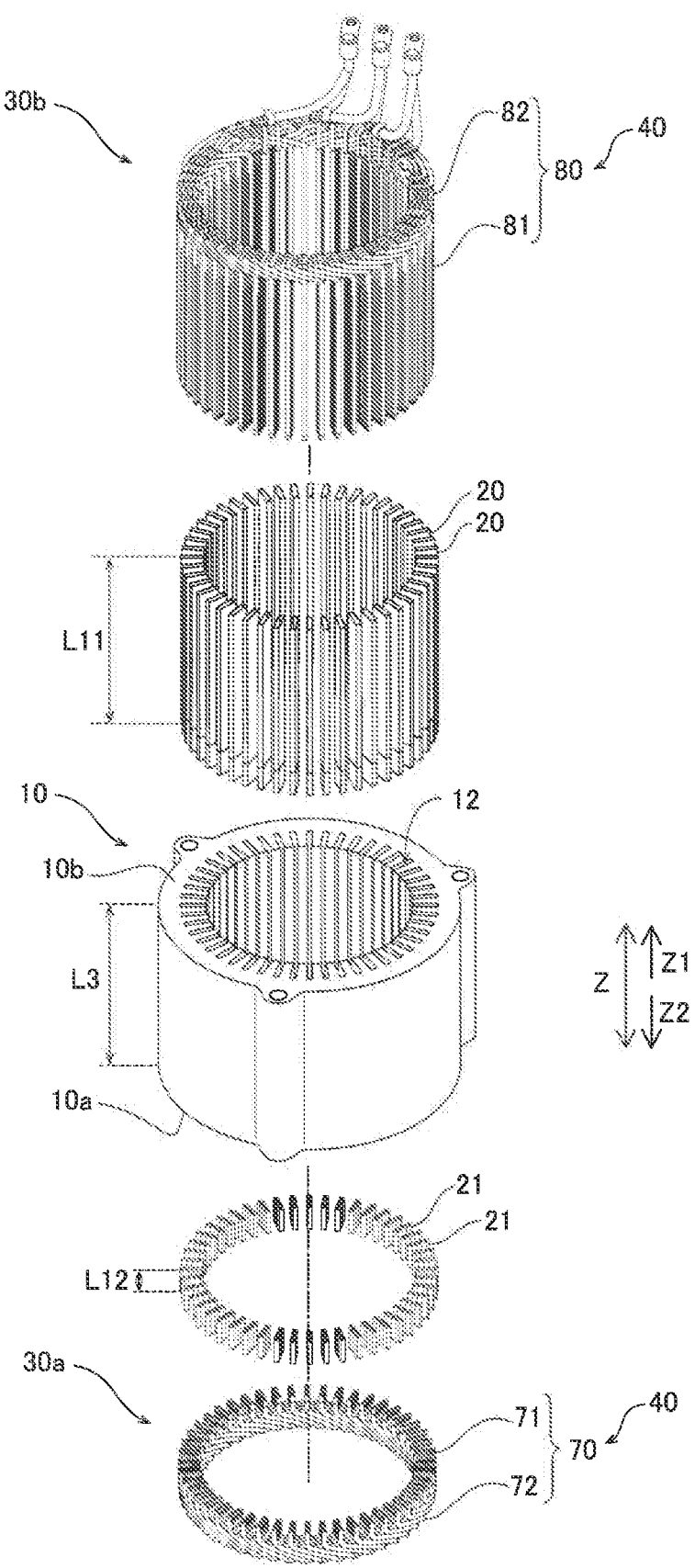
FIG. 3 is an exploded perspective view of the stator according to the first embodiment.

As shown in FIG. 2, the stator 100 includes a stator core 10, a first insulating member 20, and a coil portion 30. Further, as shown in FIG. 3, the coil portion 30 includes a first coil assembly 30a (non-lead side coil) and a second coil assembly 30b (lead side coil). Further, as shown in FIG. 3, the coil portion 30 is composed of a plurality of segment conductors 40. In addition, in the first embodiment, the stator 100 includes a second insulating member 21 that is provided separately from the first insulating member 20. The stator core 10 is an example of an "armature core" in the claims. The first insulating member 20 is an example of a "core leg portion insulating member" in the claims. The second insulating member 21 is an example of a "joint portion insulating member" in the claims.

(Structure of Stator Core)

Figure 4:
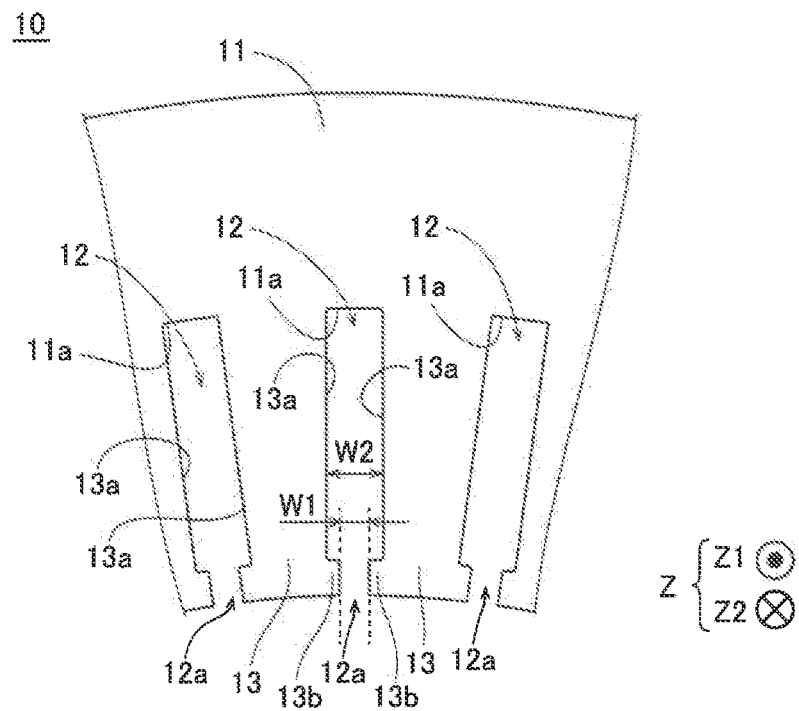
FIG. 4 is a plan view showing a configuration of a stator core according to the first to third embodiments.

The stator core 10 has a cylindrical shape with the central axis C1 (see FIG. 1) as the central axis. Further, the stator core 10 is formed, for example, by stacking a plurality of electromagnetic steel plates (for example, silicon steel plates) in the axial direction. Here, in the first embodiment, the stator core 10 is formed by stacking a plurality of silicon steel plates having a thermal expansion coefficient K1. As shown in FIG. 4, the stator core 10 is provided with a back yoke 11 having an annular shape when viewed in the axial direction, and a plurality of slots 12 that is provided on the inner radial side of the back yoke 11 and that extends in the axial direction. The stator core 10 is provided with a plurality of teeth 13 on both sides of each slot 12 in the circumferential direction.

Each slot 12 is a portion surrounded by a wall portion 11a of the back yoke 11 provided on the outer radial side and a circumferential side surface 13a of the two teeth 13. The slot 12 is provided with an opening portion 12a that opens to the inner radial side. The slot 12 opens on both sides in the axial direction. The teeth 13 are formed so as to protrude radially inward from the back yoke 11, and a protruding portion 13b configuring an opening portion 12a of the slot 12 is formed on a distal end portion on the inner radial side.

The opening portion 12a has an opening width W1 in the circumferential direction. Here, the opening width W1 corresponds to the distance between the distal end portions of the protruding portions 13b of the teeth 13. A width W2 of a part of the slot 12 in which the coil portion 30 is disposed is larger than the opening width W1. That is, the slot 12 is configured as a semi-open type slot. Here, the width W2 corresponds to the distance between the circumferential side surfaces 13a of the teeth 13 disposed on both sides of the slot 12 in the circumferential direction. The width W2 of the slot 12 is substantially constant in the radial direction.

(Structure of Coil Portion)

Figure 5:
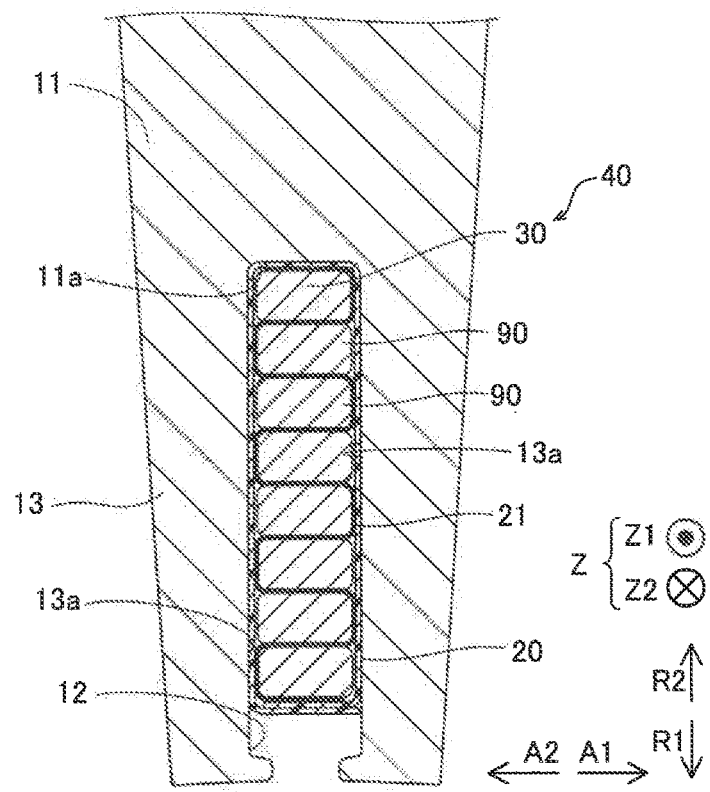
FIG. 5 is a sectional view showing a configuration of a first insulating member and a second insulating member according to the first embodiment.

As shown in FIG. 5, the coil portion 30 is configured of a flat conductor wire. In the first embodiment, the coil portion 30 is configured of a material having a thermal expansion coefficient K2 larger than the thermal expansion coefficient K1 (linear expansion coefficient) of the stator core 10. For example, the coil portion 30 (conductor body 40c) is made of copper or aluminum having the thermal expansion coefficient K2 larger than the thermal expansion coefficient K1.

As shown in FIGS. 2 and 3, the coil portion 30 is formed by the first coil assembly 30a provided on one axial side (arrow Z2 direction side) and the second coil assembly 30b provided on the other axial side (arrow Z1 direction side) being combined in the axial direction and joined. The first coil assembly 30a and the second coil assembly 30b are each formed in an annular shape centered around the same central axis C1 (see FIG. 1) as the stator core 10. As shown in FIG. 5, in the first embodiment, the coil portion 30 is formed by joining in a joint portion 90, a first leg portion 71 and a second leg portion 81, described below, of the segment conductors 40.

The coil portion 30 is configured as a wave winding coil, for example. Moreover, the coil portion 30 is configured as a coil of eight turns. That is, the coil portion 30 is configured so that eight segment conductors 40 are disposed in parallel in the slot 12 in the radial direction.

<Configuration of Wiring Connection of Coil Portion>

Figure 6:
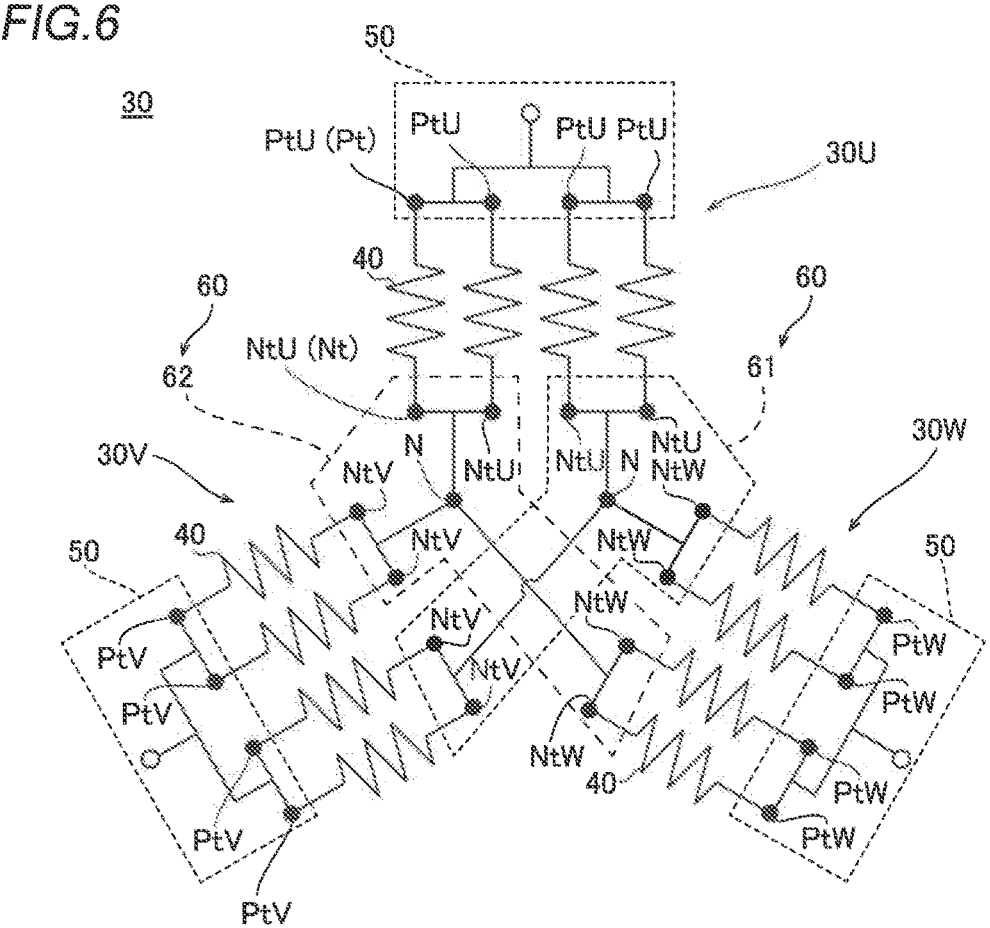
FIG. 6 is a circuit diagram showing a wiring configuration of a coil portion according to the first embodiment.

As shown in FIG. 6, the coil portion 30 is configured to generate magnetic flux by being supplied with three-phase alternating current power from a power supply unit (not shown). Specifically, the coil portions 30 are connected (wired) by three-phase Y-connection. That is, the coil portion 30 includes a U-phase coil portion 30U, a V-phase coil portion 30V, and a W-phase coil portion 30W. The coil portion 30 is provided with a plurality of (for example, two) neutral points N. Specifically, the coil portion 30 is connected in four parallel lines (star connection). That is, the U-phase coil portion 30U is provided with four neutral point connection end portions NtU and four power line connection end portions PtU. The V-phase coil portion 30V is provided with four neutral point connection end portions NtV and four power line connection end portions PtV. The W-phase coil portion 30W is provided with four neutral point connection end portions NtW and four power line connection end portions PtW. In the following description, when the U-phase, the V-phase, and the W-phase are not particularly distinguished for the neutral point connecting end portion and the power line connecting end portion, the neutral point connecting end portion and the power line connecting end portion are simply indicated as a "neutral point connecting end portion Nt" and a "power line connection end portion Pt".

<Configuration of Coil Assembly>

As shown in FIG. 3, the first coil assembly 30a includes a plurality of first segment conductors 70 (hereinafter, referred to as "first conductors 70") as the segment conductors 40. It is preferable that the first coil assembly 30a be configured by combining only the first conductors 70.

Figure 7:
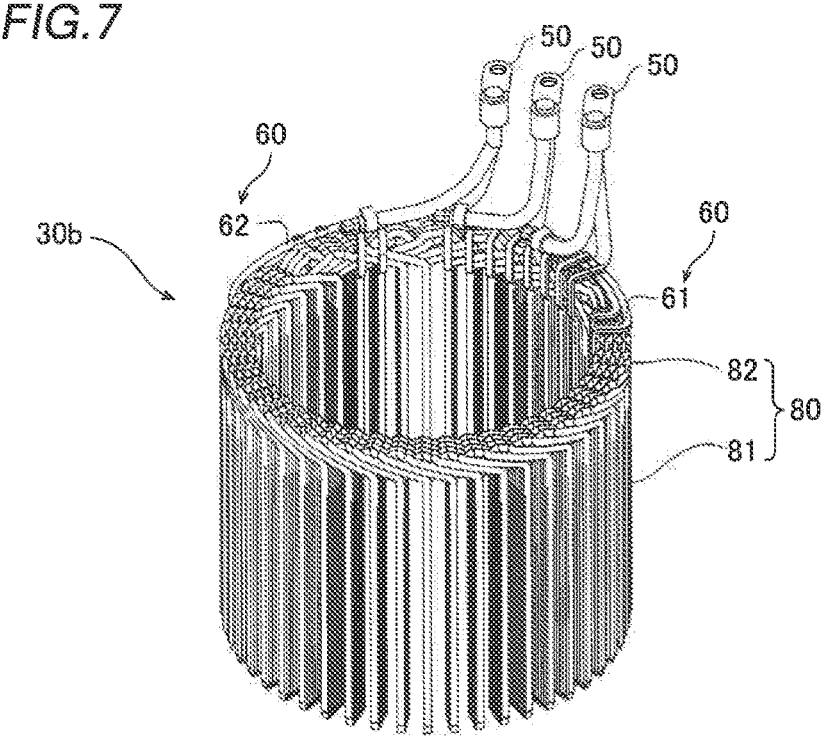
FIG. 7 is a perspective view showing a part of a second coil assembly according to the first embodiment.

As shown in FIG. 7, the second coil assembly 30b includes a plurality of (for example, three) power segment conductors 50 (hereinafter, referred to as "power conductors 50") as the segment conductors 40, and a plurality of (for example, two) neutral-point segment conductors 60 (hereinafter referred to as "neutral-point conductors 60") as the segment conductors 40, and second segment conductors 80 (hereinafter, referred to as "second conductors 80") that are conductors (general segment conductors 40) different from the power conductors 50 and the neutral-point conductors 60 among the segment conductors 40 and that configure the coil portion 30. That is, all of the power conductors 50 and the neutral point conductors 60 provided in the stator 100 are provided in the second coil assembly 30b. The power conductors 50 and the neutral point conductors 60 are examples of a "second segment conductor" in the claims. The first conductors 70 are an example of a "first segment conductor" in the claims. The second conductors 80 are an example of the "second segment conductor" in the claims.

(Configuration of Segment Conductor)

Figure 8:
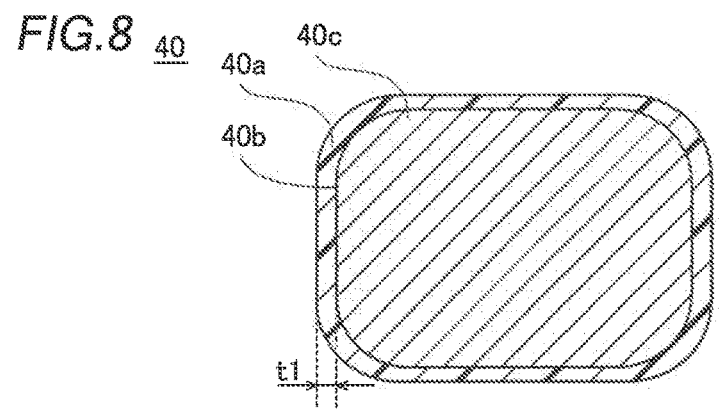
FIG. 8 is a cross-sectional view showing a configuration of a segment conductor according to the first embodiment.

As shown in FIG. 8, the segment conductor 40 is configured as a flat conductor wire having a substantially rectangular cross section. An insulating coating 40a having a thickness t1 is provided on a conductor surface 40b of the segment conductor 40. The thickness t1 of the insulating coating 40a is set, for example, to such an extent that interphase insulating performance (insulation between the first coil end portions 72 and insulation between the second coil end portions 82 (see FIG. 2)) can be ensured. Note that, in FIG. 8, the size relationship such as the thickness is highlighted for the sake of explanation, and the present disclosure is not limited to this example indicated in the drawing.

<Structure of First Conductor and Second Conductor>

Figure 9:
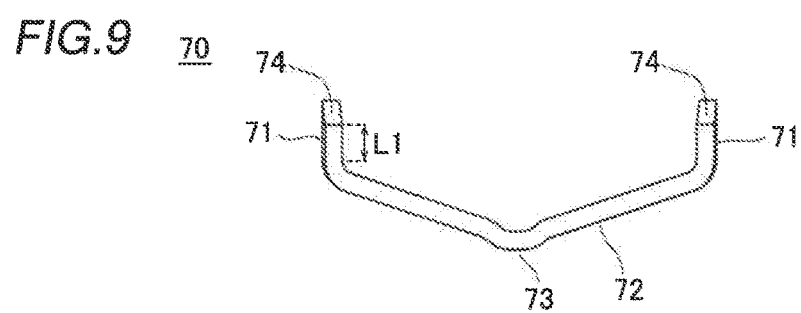
FIG. 9 is a figure showing a configuration of a first segment conductor according to the first embodiment.
Figure 10:
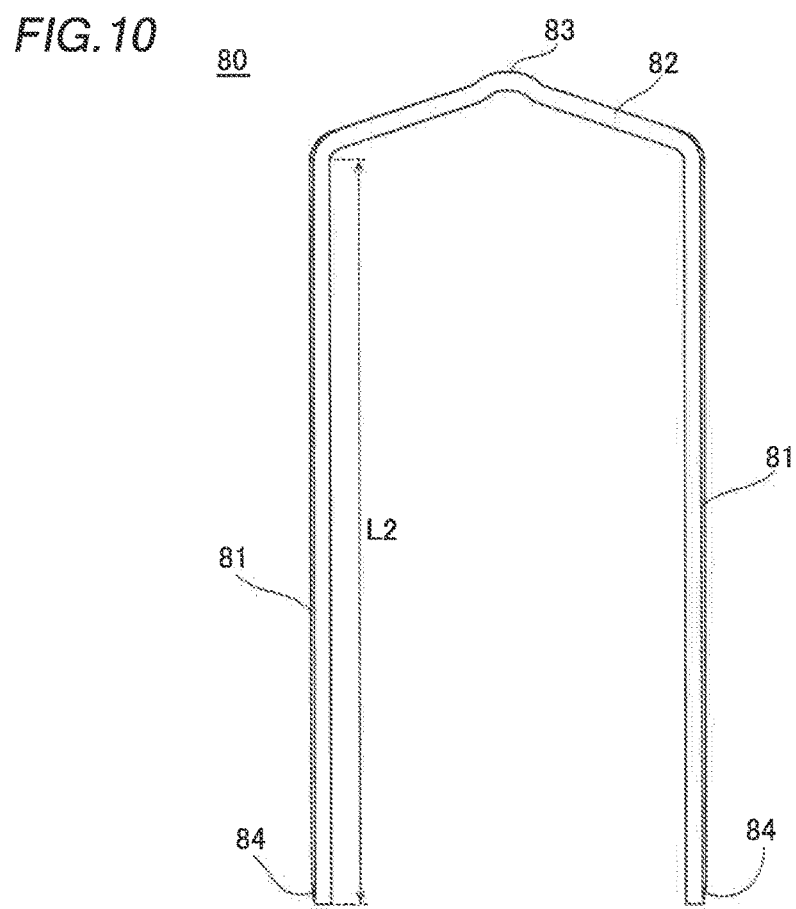
FIG. 10 is a figure showing a configuration of a second segment conductor according to the first embodiment.

As shown in FIGS. 9 and 10, the segment conductors 40 include the first conductors 70 disposed on one axial side (Z2 direction side) of the stator core 10 and the second conductors 80 that are disposed on the other axial side (Z1 direction side) of the stator core 10 and that face the first conductors 70 in the central axis direction. That is, the coil portion 30 is formed by joining the first conductors 70 and the second conductors 80, which are divided into two in the axial direction. Here, the second conductors 80 are the segment conductors 40 other than the power conductors 50 and the neutral point conductors 60 among the segment conductors 40 that configure the second coil assembly 30b. In the first embodiment, each first conductor 70 includes the first leg portion 71 which has a first length L1 in an axial direction. Each second conductor 80 include the second leg portion 81 that is disposed on the Z1 direction side of the first leg portion 71 and that has a second length L2 that is greater than the first length L1 in the axial direction.

In the first embodiment, as shown in FIG. 9, the first conductors 70 are formed so as to have a U-shape (substantially U-shape) when viewed in the radial direction by connecting a pair of the first leg portions 71 in which the first leg portions 71 are disposed in the slots 12 different from each other. The coil pitch of the first conductors 70 is six. That is, the first leg portions 71 of the pair of first leg portions 71 are disposed at positions different in the circumferential direction by six slots 12. That is, five slots 12 are provided between the slot 12 in which one first leg portion 71 of the pair of first leg portions 71 is disposed and the slot 12 in which the other first leg portion 71 of the pair of first leg portions 71 is disposed. Specifically, each first conductor 70 includes the pair of the first leg portions 71 that are disposed in different slots 12 and that are each linearly formed along the axial direction, and a first coil end portion 72. The first leg portion 71 means a portion disposed in the slot 12 from the axial position of the end surface 10a (see FIG. 2) of the stator core 10. The first coil end portion 72 means a portion that is formed to be continuous with the first leg portion 71 and that is disposed on the outer axial side of the end surface 10a of the stator core 10. The first coil end portion 72 has a bent shape that bends in the axial direction. Further, the first coil end portion 72 has a first crank part 73 formed in a crank shape in which the first crank part 73 is bent in a stepwise manner by the width of one segment conductor 40 in the radial direction when viewed in the axial direction. That is, the radial width of the first crank part 73 is twice the width of one segment conductor 40.

Further, the axial lengths L1 of the pair of first leg portions 71 are substantially equal to each other. The axial length L1 of the first leg portions 71 means the length from the most distal end of the first leg portion 71 to the bent part connected to the first coil end portion 72. The axial length L1 is smaller than an axial length L3 of the stator core 10 (see FIG. 2). The axial length L3 of the stator core 10 means the distance (interval) between the end surface 10a and the end surface 10b in the axial direction.

Similarly, as shown in FIG. 10, the second conductor 80 includes the pair of second leg portions 81 disposed in the slot 12 and the second coil end portion 82. The second coil end portion 82 also has a second crank part 83. In the first embodiment, the second conductor 80 is formed to have a U-shape by connecting the pair of second leg portions 81, which is disposed in the different slots 12, to each other. The axial lengths L2 of the pair of second leg portions 81 of the second conductor 80 are substantially equal to each other. Further, the axial length L2 of the pair of second leg portions 81 of the second conductor 80 is larger than the axial length L1 of the pair of first leg portions 71 of the first conductor 70 (L2>L1). The axial length L2 of the second leg portions 81 means the length from the most distal end of the second leg portions 81 to the bent part connected to the second coil end portion 82.

<Configuration of Power Conductor>

Figure 11:
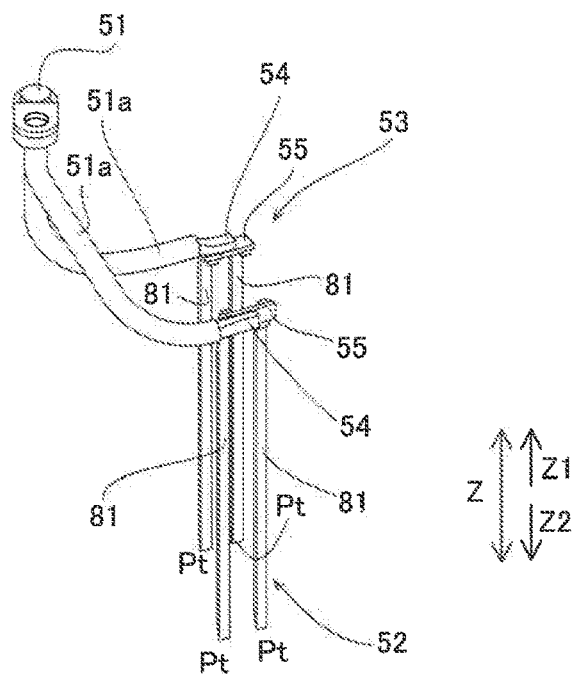
FIG. 11 is a diagram showing a configuration of a power segment conductor according to the first embodiment.

As shown in FIG. 11, in the power conductor 50, a plurality (for example, four) of the power line connection end portions Pt of the same phase are electrically connected to each other, and a plurality of the connected power line connection end portions Pt and one power terminal member 51 are electrically connected. In the power conductor 50, the second leg portion 81 joined to one of the pair of first leg portions 71 (see FIG. 14) and the power terminal member 51 are joined. The power conductor 50 has a function of introducing electric power into the coil portion 30 from the power supply unit (not shown).

Specifically, the power conductor 50 includes an outer radial side power conductor 52 that is disposed on the outer radial side of the slot 12 (see FIG. 1) and that has the power line connection end portion Pt, and an inner radial side power conductor 53 that is disposed on the inner radial side and the outer axial side of the outer radial side power conductor 52 and that has the power line connection end portion Pt. In other words, the power conductor 50 is formed in a bifurcated shape.

The outer radial side power conductor 52 and the power terminal member 51 are electrically connected by a lead wire 54. The inner radial side power conductor 53 and the power terminal member 51 are electrically connected to each other by the lead wire 54. The outer radial side power conductor 52 and the inner radial side power conductor 53 are electrically connected via the power terminal member 51 and the lead wire 54. The lead wire 54 is formed of a stranded wire (conductor) and an insulating tube 51a is disposed on the outer circumference, for example.

The outer radial side power conductor 52 and the inner radial side power conductor 53 are each provided with the second leg portion 81 but are not provided with the first coil end portion 72 or the second coil end portion 82. Further, in the outer radial side power conductor 52 and the inner radial side power conductor 53, the lead wire 54 and the second leg portion 81 are joined via a conductor plate 55. For example, the joining is performed by brazing or welding (for example, any one of resistance welding, arc welding, laser welding, or high energy beam welding).

<Structure of Neutral Point Conductor>

As shown in FIG. 1, the neutral point conductor 60 includes an outer radial side neutral point conductor 61 and an inner radial side neutral point conductor 62. As shown in FIG. 6, the outer radial side neutral point conductor 61 and the inner radial side neutral point conductor 62 each include the neutral point N, and the neutral point connecting end portion NtU of the U-phase coil portion 30U, the neutral point connection end portion NtV of the V-phase coil portion 30V, and the neutral point connection end portion NtW of the W-phase coil portion 30W are electrically connected.

Figure 12:
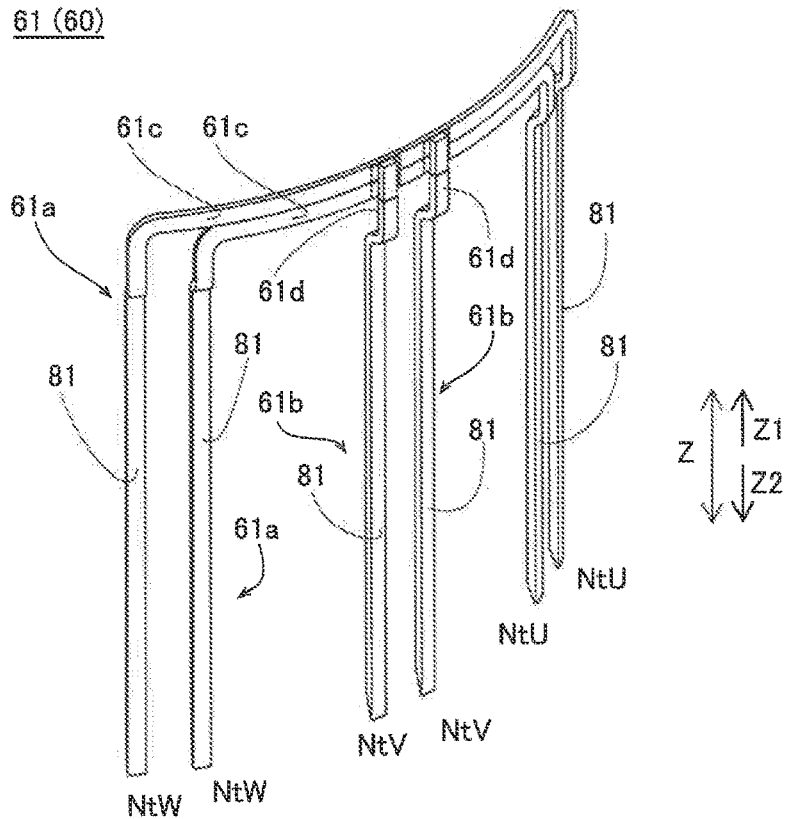
FIG. 12 is a figure showing a configuration of an outer radial side neutral point conductor according to the first embodiment.

As shown in FIG. 12, each outer radial side neutral point conductor 61 includes two U-phase W-phase neutral point segment conductors 61a and two V-phase neutral point segment conductors 61b. The U-phase W-phase neutral point segment conductors 61a include the U-phase second leg portions 81 connected to the first leg portions 71 of the first conductors 70 for the U-phase among the three-phase alternating current, the W-phase second leg portions 81 connected to the W-phase first leg portions 71, and two neutral point coil end portions 61c that each connect the U-phase second leg portion 81 and the W-phase second leg portion 81. The neutral point coil end portion 61c is formed to be continuous with the U-phase second leg portion 81 and is formed to be continuous with the W-phase second leg portion 81.

The U-phase W-phase neutral point segment conductor 61a is formed to have a substantially U-shape (substantially U-shape) when viewed from the inner radial side. The V-phase neutral point segment conductor 61b is formed in a substantially linear shape when viewed from the inner radial side.

As shown in FIG. 1, the neutral point coil end portion 61c is formed along the circumferential direction on the outer radial side of the second coil end portion 82 of the second conductor 80. The neutral point coil end portion 61c is formed in a substantially arc shape when viewed in the arrow Z2 direction. One of the two U-phase W-phase neutral point segment conductors 61a is disposed on the other outer axial side (arrow Z1 direction side).

As shown in FIG. 12, the V-phase neutral point segment conductor 61b includes a V-phase second leg portion 81 connected to the V-phase first conductor 70 and a neutral point coil end portion 61d. The neutral point coil end portion 61d is formed so as to protrude from the second leg portion 81 in the outer axial direction (in the arrow Z1 direction). The two neutral point coil end portions 61d are electrically joined to each other by being joined to both of the two neutral point coil end portions 61c.

Figure 13:
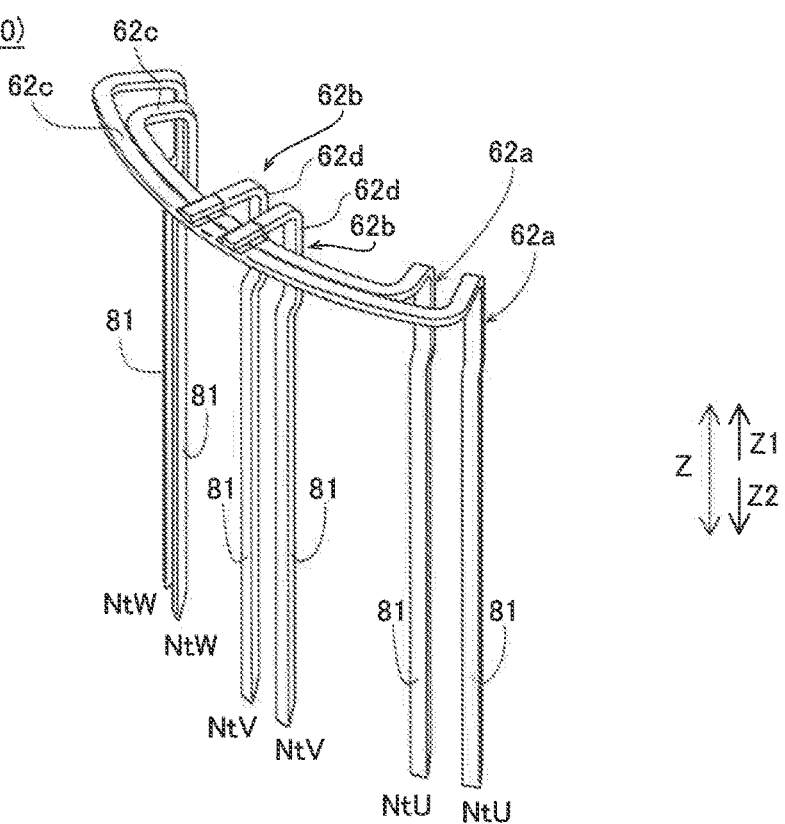
FIG. 13 is a figure showing a configuration of an inner radial side neutral point conductor according to the first embodiment.

As shown in FIG. 13, the inner radial side neutral point conductor 62 includes two U-phase W-phase neutral point segment conductors 62a and two V-phase neutral point segment conductors 62b. The U-phase W-phase neutral point segment conductors 62a include the U-phase second leg portions 81 connected to the first leg portions 71 of the first conductors 70 for the U-phase among the three-phase alternating current, the W-phase second leg portions 81 connected to the W-phase first conductor 70, and the neutral point coil end portions 62c that each connect the U-phase second leg portion 81 and the W-phase second leg portion 81. The neutral point coil end portions 62c are formed to be continuous with the U-phase second leg portions 81 and to be continuous with the W-phase second leg portion 81. As a result, the U-phase W-phase neutral point segment conductors 62a are formed in a substantially U-shape (substantially U-shape) when viewed from the inner radial side. The V-phase neutral point segment conductors 62b are formed in a substantially linear shape when viewed from the inner radial side.

Figure 14:
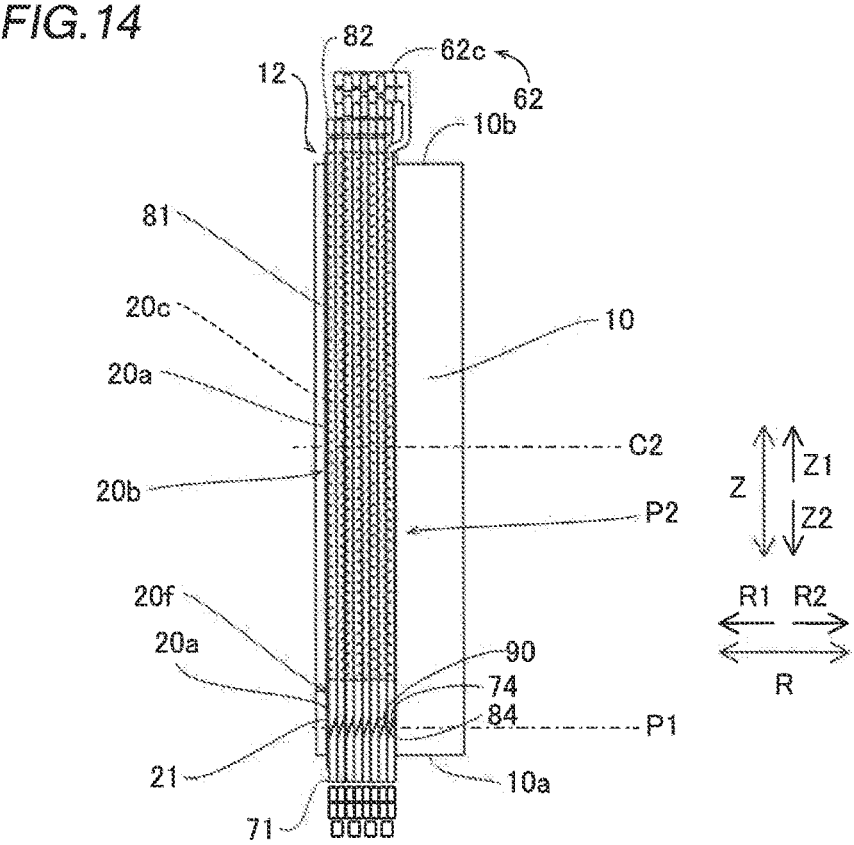
FIG. 14 is a sectional view taken along line 1000-1000 in FIG. 1.

As shown in FIG. 14, the neutral point coil end portion 62c is formed so as to protrude axially outward with respect to the second coil end portion 82 of the second conductor 80. The neutral-point coil end portion 62c is disposed close to the outer axial side of the second coil end portion 82 of the second conductor 80, and is formed along the circumferential direction when viewed in the axial direction. One of the two U-phase W-phase neutral point segment conductors 62a is disposed on outer radial side of the other U-phase W-phase neutral point segment conductor 62a.

The V-phase neutral point segment conductor 62b includes the V-phase second leg portion 81 connected to the first leg portion 71 of the V-phase first conductor 70, and a neutral point coil end portion 62d. The neutral point coil end portion 62d is formed so as to protrude from the second leg portion 81 in the outer axial direction (in the direction of the arrow Z1). The two neutral point coil end portions 62d are electrically joined by being joined to both of the two neutral point coil end portions 62c.

(Structure of Joint Portion)

As shown in FIG. 14, the plurality of first conductors 70 and the plurality of second conductors 80 are joined in one slot 12. Further, in the first embodiment, the axial length L2 of the pair of second leg portions 81 of the second conductor 80 is larger than the axial length L1 of the pair of first leg portions 71 of the first conductor 70 (L2>L1). Thus, the joining portion 90 in which the first conductor 70 and the second conductor 80 are joined is disposed in the slot 12, on one end portion side (near the end surface 10a) of the axial center of the stator core 10. Further, in all the slots 12 of the stator core 10, the joint portion 90 is provided in the vicinity of the end surface 10a on one axial side. Here, the vicinity of the end surface 10a includes, in the axial direction, the position that is on the Z2 direction side of the axial center C2 and that is the same position as the end surface 10a, and the range within the substantially insulating creepage distance in the Z1 direction or the Z2 direction from the end surface 10a, for example.

Further, in the first embodiment, the plurality of first leg portions 71 are provided in one slot 12 so as to be adjacent to each other in the radial direction of the stator core 10. That is, the joint portions 90 of the first leg portions 71 and the second leg portions 81 are disposed adjacent to each other in the radial direction in one slot 12.

<Configuration of Inclined Surface>

Figure 15:
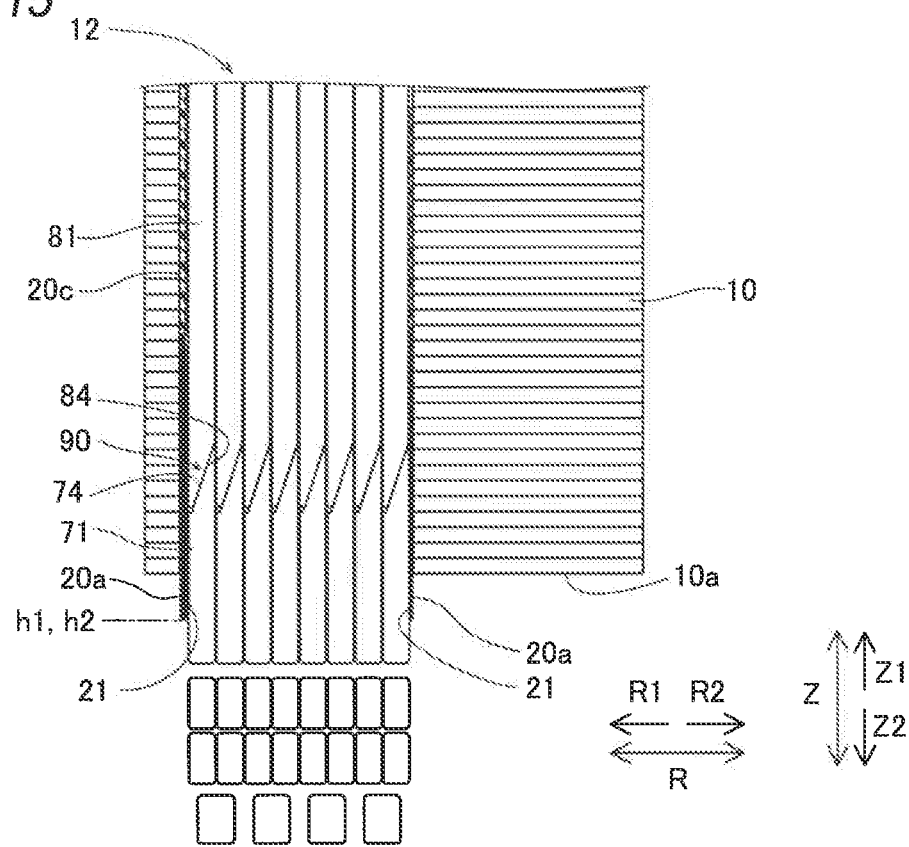
FIG. 15 is a figure showing the relationship between a disposition position of a first insulating member and a disposition position of a second insulating member according to the first embodiment.

As shown in FIG. 15, the first conductor 70 of the plurality of segment conductors 40 is provided with a first facing surface 74, which is inclined with respect to a plane orthogonal to the axial direction, at the tip of the first leg portion 71. In addition, the second conductor 80 is provided with a second facing surface 84, which is inclined with respect to the plane orthogonal to the axial direction, at the tip of the second leg portion 81. The joining portion 90 is formed by joining the first facing surface 74 and the second facing surface 84, which face each other in the radial direction, of the first conductor 70 and the second conductor 80 which face each other in the axial direction. That is, the joint portion 90 means a portion in which the first conductor 70 and the second conductor 80 are joined.

Specifically, the first leg portion 71 includes the first facing surface 74 that faces the second leg portion 81 and that also faces the inner radial side (arrow R1 direction side). In addition, the second leg portion 81 includes the second facing surface 84 that faces the first facing surface 74 and that also faces the outer radial side (arrow R2 direction side). The first conductor 70 and the second conductor 80 are joined by joining the first facing surface 74 of the first leg portion 71 and the second facing surface 84 of the second leg portion 81.

Further, the first facing surface 74 of the first leg portion 71 and the second facing surface 84 of the second leg portion 81 are joined by a joining material (not shown), for example. The joining material joins and electrically connects the first facing surface 74 and the second facing surface 84. Specifically, the bonding material includes a conductive material such as silver or copper. It is preferable that the joining material is a paste form joining material (silver nanopaste) that contains, as conductive particles, metal particles obtained by miniaturizing silver to a nanometer level, in a solvent. Further, the bonding material contains a member (resin member) that volatilizes when heated, and has a function of bringing the first facing surface 74 and the second facing surface 84 close to each other by heating the volatilizing member and decreasing the volume of the bonding material.

As shown in FIG. 15, in the first embodiment, the joint portions 90, each in which the first conductor 70 and the second conductor 80 are joined, are configured so that the joint portions 90 adjacent in the radial overlap with each other when viewed in the radial direction. Specifically, the plurality of (all) joint portions 90 disposed in one slot 12 are configured to overlap with each other when viewed in the radial direction. That is, all the joint portions 90 disposed in one slot 12 are disposed in a state in which the joint portions 90 are aligned along the horizontal direction. In other words, each position of the joint portions 90 in the axial direction in one slot 12 are substantially equal to each other. The joining portion 90 is a part in which the first facing surface 74 of the first leg portion 71 and the second facing surface 84 of the second leg portion 81 are joined (overlapped) when viewed in the radial direction.

(Configuration of First Insulating Member)

Figure 16:
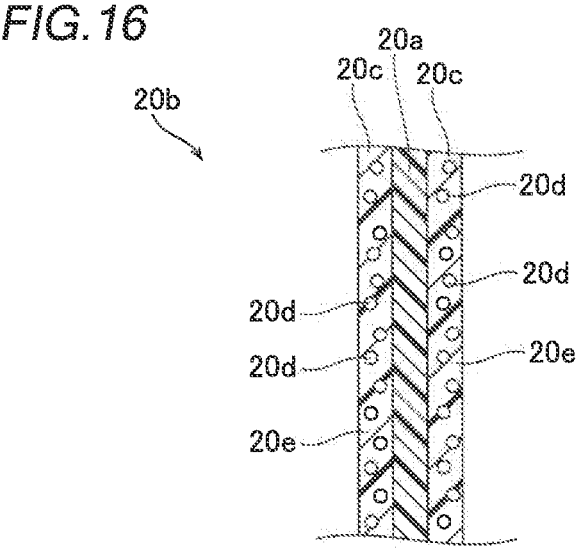
FIG. 16 is a sectional drawing schematically showing a configuration of the first insulating member according to the first embodiment.
Figure 17:
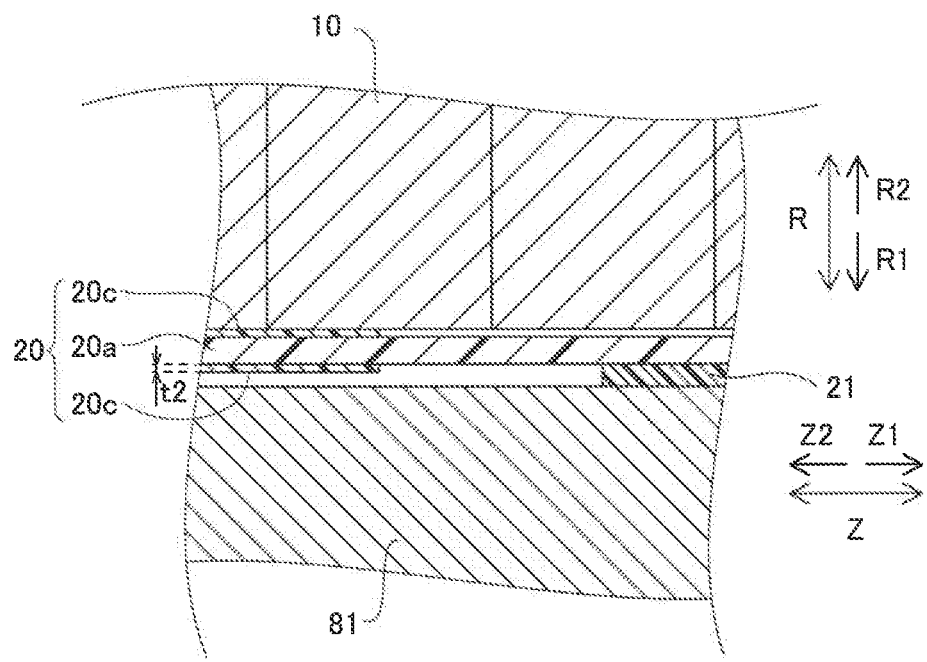
FIG. 17 is a sectional drawing showing the configuration of the first insulating member and the second insulating member including a fixing layer before foaming according to the first embodiment.
Figure 18:
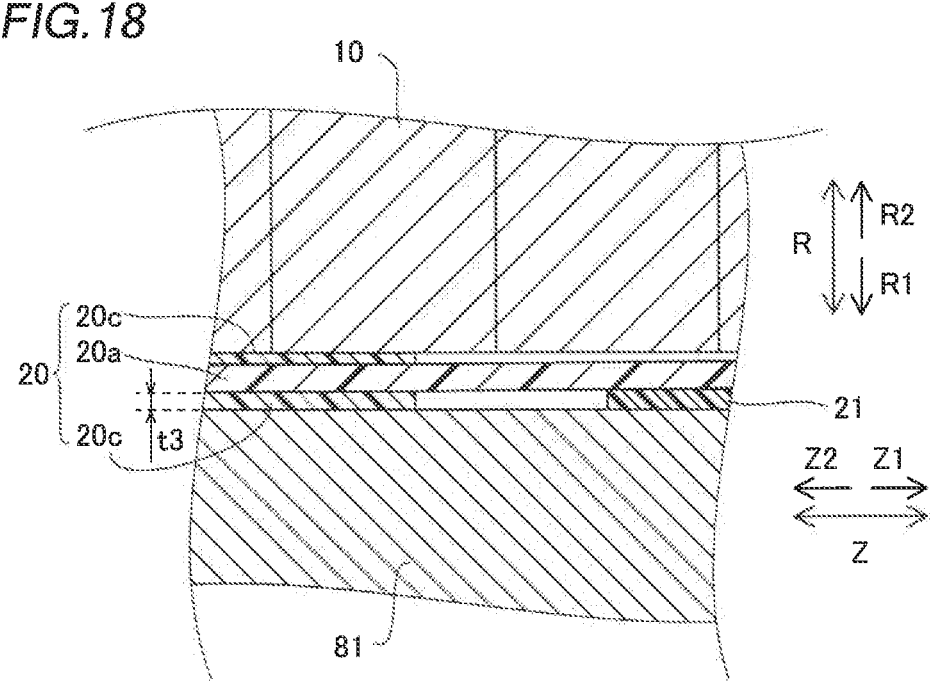
FIG. 18 is sectional drawing showing a boundary vicinity of the first insulating member and the second insulating member including the fixing layer after foaming according to the first embodiment.

As shown in FIG. 5, the first insulating member 20 is disposed between the wall portion 11a and the teeth 13 and the first leg portion 71 and the second leg portion 81 (segment conductor 40). As shown in FIG. 16, the first insulating member 20 has a three-layer configuration. Specifically, as shown in FIG. 14, in the first embodiment, the first insulating member 20 includes, in the slot 12: an insulating layer 20a that is provided between the wall portion 11a of the back yoke 11 and the circumferential side surface 13a of the teeth 13 (see FIG. 5), and the first leg portion 71 and the second leg portion 81, and that insulates the wall portion 11a and the circumferential side surface 13a from the first leg portion 71 and the second leg portion 81; and a fixing layer 20c that is provided so as to overlap with a part 20b at a position (region) (P2) different from the position P1 in the axial direction corresponding to the joining portion 90 among the insulating layer 20a and that fixes the stator core 10 and the second leg portion 81. The fixing layer 20c is preferably configured as an adhesive layer containing an adhesive. In addition, the position P2 includes, in the axial direction, the entire region inside the slot 12 of the part excluding the axial position P1, and a part near the end surface 10b of the stator core 10 (including the part outside the slot 12 in the axial direction) for example.

And the first insulating member 20 is disposed so as to integrally cover the surroundings of the second leg portions 81 disposed in parallel in the radial direction when viewed in the arrow Z2 direction. In other words, both sides in the circumferential direction and both sides in the radial direction of the second leg portions 81 disposed in parallel in the radial direction are covered by the first insulating member 20. In this way, the first insulating member 20 can ensure the insulation between the joint portion 90 and the stator core 10.

The insulating layer 20a is configured of a poly phenylene sulfide resin (PPS), for example. The insulating layer 20a may be formed in a non-woven fabric form such as aramid paper. In addition, in the first embodiment, as shown in FIG. 14, the insulating layer 20a is provided from the end surface 10a on one axial side of the stator core 10 across to the end surface 10b on the other axial side. That is, the insulating layer 20a is disposed so as to cover the wall portion 11a and the circumferential side surface 13a in each slot. In addition, to "cover" does not only mean to cover all parts of the wall portion 11a and the circumferential side surface 13a, but means a broad concept including a case in which the inner radial side part (distal end gap part) of the circumferential side surface 13a is exposed, as shown in FIG. 5.

As shown in FIG. 16, in the first embodiment, the fixing layer 20c includes a foaming agent 20d (expanding agent) that foams due to heat. Specifically, the fixing layer 20c is formed, for example, by mixing a plurality of capsule bodies as the foaming agent 20d with a thermosetting resin 20e. The foaming agent 20d is configured to expand the volume of the capsule body when heated to a foaming temperature T1 or higher. The thickness of the fixing layer 20c increases from t2 (see FIG. 17) to t3 (see FIG. 18) by being heated in the manufacturing process of the stator 100, for example. As a result, the fixing layer 20c fills the space between the second leg portion 81 and the wall portion 11a and the circumferential side surface 13a by the foaming agent 20d foaming (expanding) when heated.

Further, the thermosetting resin 20e is configured to be cured by being heated to a curing temperature T2 or higher which is higher than the foaming temperature T1. The thermosetting resin 20e forming the fixing layer 20c is, for example, an epoxy resin. The fixing layer 20c is configured so that when the fixing layer 20c is heated, the thermosetting resin 20e is cured so that the second leg portion 81 and the wall portion 11a and the circumferential side surface 13a are bonded and fixed.

As shown in FIG. 14, in the first embodiment, the fixing layer 20c containing the foaming agent 20d in the foamed state is filled between at least a part of the second leg portion 81, and the wall portion 11a and the circumferential side surface 13a that configure the slot 12, at the position P2 different from the position P1 in the axial direction corresponding to the joint portion 90. Specifically, in the first embodiment, the fixing layer 20c is provided so as to overlap with the part 20b of the insulating layer 20a on the other axial side (Z1 direction side) of the position P1 in the axial direction corresponding to the joint portion 90. In other words, the fixing layer 20c is provided so as to overlap with the part 20b of the insulating layer 20a on the other axial side of the vicinity of the end surface 10a on the one axial side (Z2 direction side). Further, the fixing layer 20c is provided in the slot 12 so as to overlap with the part 20b of the insulating layer 20a that is disposed between the second leg portion 81 and the stator core 10. For example, as shown in FIG. 16, the fixing layer 20c is provided so as to overlap with and sandwich the insulating layer 20a in the part 20b of the insulating layer 20a at a position different from the axial position corresponding to the joint portion 90.

Figure 19:
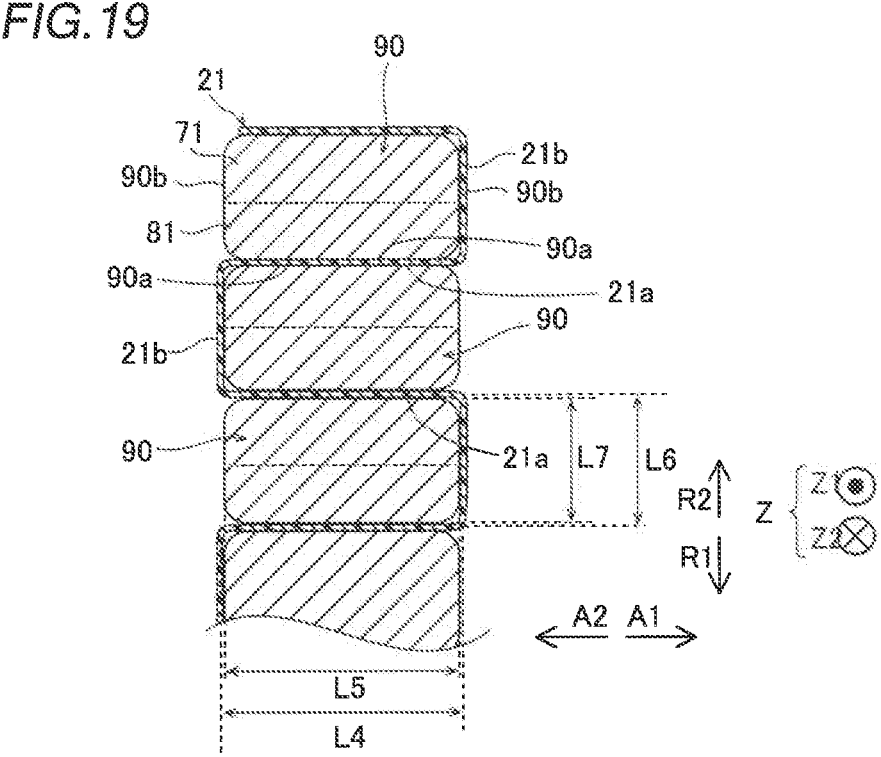
FIG. 19 is a sectional view showing the configuration of the second insulating member according to the first embodiment.

Further, in the first embodiment, as shown in FIG. 15, the first insulating member 20 provided between the slot 12 and the coil portion 30 and the second insulating member 21 provided separately from the first insulating member 20 are provided. As shown in FIG. 19, the joint portions 90 in which the first conductor 70 and the second conductor 80 are joined between the coils adjacent in the radial direction in one slot 12 are insulated by the second insulating member 21 that is provided separate from the first insulating member 20. The term "coils adjacent in the radial direction" means a linear part of the coil portion 30 that is disposed in the slot 12 after the first conductor 70 and the second conductor 80 are joined.

Here, in the first embodiment, as shown in FIG. 19, the second insulating member 21 is formed by folding one sheet-shaped insulating member such as a Nomex. The second insulating member 21 includes: at least two or more facing surface insulating parts 21a that cover a facing surface 90a of the joint portions 90 that are adjacent in the radial direction; and a circumferential surface insulating part 21b that is continuous from both end portions of the facing surface insulating part 21a in the circumferential direction and that covers one of the circumferential surfaces 90b of the joint portion 90 that are adjacent in the radial direction for at least the insulation distance. The facing surface 90a of the joint portion 90 means an outer radial surface and an inner radial surface, which face each other, of the joint portions 90 that are radially adjacent to each other. The insulation distance means a distance (creepage distance) that is a length along the circumferential surface insulating part 21b in the radial direction and that is sufficient for insulating the joint portions 90, which are adjacent to each other, from each other. The circumferential surface 90b means a surface of the joint portion 90 that intersects the circumferential direction. In other words, the circumferential surface 90b means a surface extending in the radial direction and the axial direction. The insulation distance is an example of a "predetermined distance" in the claims.

Figure 20:
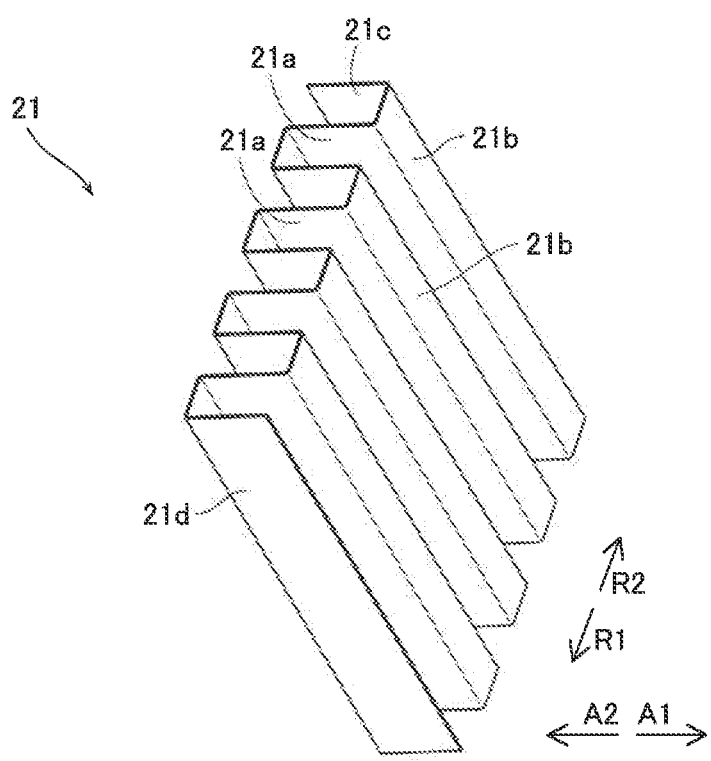
FIG. 20 is a perspective view showing the configuration of the second insulating member according to the first embodiment.

As shown in FIG. 20, the second insulating member 21 includes a part 21c that covers an outer radial side of the joint portion 90 disposed on the outermost radial side, and a part 21d that covers the inner dial side of the joint portion 90 disposed on the innermost radial side.

Further, in the second insulating member 21, the facing surface insulating parts 21a that are adjacent in the radial direction are connected to each other by the circumferential surface insulating part 21b in one or the other circumferential direction. Specifically, the facing surface insulating part 21a on the outer radial side among the pair of facing surface insulating parts 21a disposed adjacent to each other in the radial direction, the circumferential surface insulating part 21b provided on one side in the circumferential direction, the facing surface insulating part 21a on the inner radial side among the pair of facing surface insulating parts 21a, and the circumferential surface insulating part 21b provided on the other side in the circumferential direction are formed to be continuous. That is, the circumferential surface 90b on the A1 direction side of the joint portion 90 and the circumferential surface 90b on the A2 direction side of the joint portion 90 are alternately covered by the circumferential surface insulating part 21b. In other words, the second insulating member 21 is configured so as not to continuously cover the circumferential surfaces 90b of the plurality of joint portions 90 disposed adjacent to each other in the radial direction.

Here, in the first embodiment, the facing surface insulating part 21a of the second insulating member 21 is provided so as to overlap with the entire facing surface 90a of the joint portion 90 when viewed in the radial direction. That is, a circumferential length L4 (see FIG. 19) of the facing surface insulating part 21a is larger than a circumferential length L5 (see FIG. 19) of the facing surface 90a.

The circumferential surface insulating part 21b of the second insulating member 21 is provided so as to overlap with the circumferential surface 90b of the joint portion 90 when viewed from the circumferential direction. Specifically, the circumferential surface insulating part 21b is provided so as to overlap with the entire surface of the circumferential surface 90b of the joint portion 90 when viewed from the circumferential direction. Specifically, a radial length L6 (see FIG. 19) of the circumferential surface insulating part 21b is larger than a radial length L7 (see FIG. 19) of the circumferential surface 90b.

Thus, the second insulating member 21 has a meandering shape (bellows shape) when viewed from the central axis direction. Further, all the joint portions 90 disposed in one slot 12 are insulated from each other by one second insulating member 21. This makes it possible to reduce the number of steps for disposing the second insulating member 21 as compared to the case in which the plurality of joint portions 90 disposed in one slot 12 are individually covered by the insulating member.

Further, in the first embodiment, as shown in FIG. 20, the second insulating member 21 is configured to be expandable/contractible along the radial direction. The second insulating member 21 is made of a flexible sheet-shaped insulating member, and is configured to not continuously cover the circumferential surfaces 90b of the plurality of joint portions 90 disposed adjacent to each other in the radial direction. Thus, even when the first leg portion 71 and the second leg portion 81 are pressed in the radial direction or the axial direction when the first leg portion 71 and the second leg portion 81 are joined, the second insulating member 21 can be deformed with the movement of the first leg portion 71 and the second leg portion 81.

Further, as shown in FIG. 15, the second insulating member 21 is disposed so that an edge portion on one axial side protrudes outward from the end surface 10a of the stator core 10 in the central axis direction. Specifically, in the central axis direction, the Z2 direction side of the second insulating member 21 protrudes outward from the end surface 10a of the stator core 10, and the Z1 direction side is disposed in the slot 12.

Further, as shown in FIG. 15, the first insulating member 20 is also disposed together with the second insulating member 21 so as to protrude outward from the end surface 10a of the stator core 10 in the central axis direction. A height position h1 of the part of the second insulating member 21 protruding outward from the end surface 10a of the stator core 10 and a height position h2 of the part of the first insulating member 20 protruding outward from the end surface 10a of the stator core 10 are substantially equal. The protruding amount of the first insulating member 20 and the second insulating member 21 from the end surface 10a of the stator core 10 is adjusted to a degree in which the first insulating member 20 and the second insulating member 21 are not bent by coming into contact with the second coil end portion 82 of the second segment conductor 80.

Further, as shown in FIG. 3, a length L12 of the second insulating member 21 is smaller than a length L11 of the first insulating member 20 in the central axis direction. Specifically, the length L11 of the first insulating member 20 is larger than the length L3 of the stator core 10 in the central axis direction. The length L12 of the second insulating member 21 is smaller than the length L3 of the stator core 10. The second insulating member 21 is provided so as to cover the joint portion 90 and extend from the joint portion 90 toward the Z1 direction side and the Z2 direction side. The length L12 of the second insulating member 21 is adjusted based on the magnitude of the voltage applied to the coil portion 30 (based on the required creepage distance).

Figure 21:
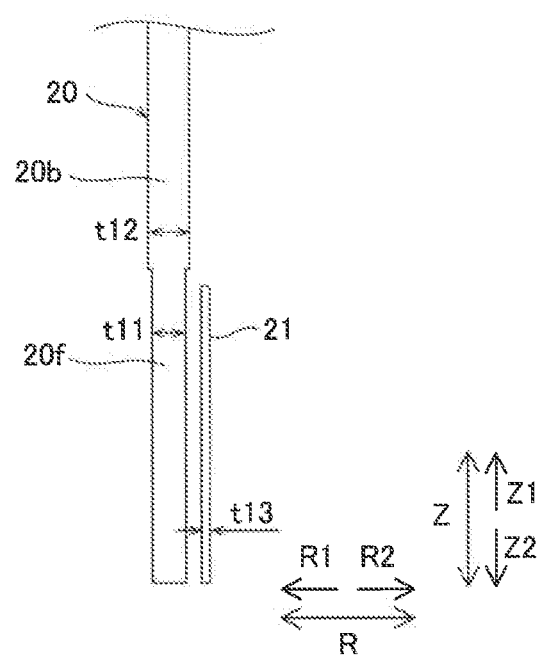
FIG. 21 is a figure showing the thickness of the first insulating member and the thickness of the second insulating member according to the first embodiment.

Further, since the length L12 of the second insulating member 21 is smaller than the length L11 of the first insulating member 20, as shown in FIG. 21, the first insulating member 20 has a part 20f that overlaps with the second insulating member 21 and the part 20b that does not overlap with the second insulating member 21 when viewed in the radial direction. Specifically, the first insulating member 20 overlaps with the second insulating member 21 in the vicinity of the end portion (end surface 10a) in the central axis direction in the slot 12. A thickness t11 of the part 20f of the first insulating member 20 that overlaps with the second insulating member 21 is smaller than a thickness t12 of the part 20b of the first insulating member 20 that does not overlap with the second insulating member 21.

A thickness t13 of the second insulating member 21 is smaller than the thickness t11. Further, the thickness t12 is obtained by adding the thickness t11 to the thickness t3 of two sheets (t3×2) of the fixing layer 20c.

Further, in the first embodiment, the second insulating member 21 is disposed on one axial side (Z2 direction side) with respect to the fixing layer 20c of the first insulating member 20 and between the joint portions 90 in the radial direction, and is configured to insulate the joint portions 90 from each other. Specifically, the fixing layer 20c is provided so as to overlap with the part 20b of the insulating layer 20a that does not overlap with the second insulating member 21 in the radial direction. Further, the insulating layer 20a is disposed in the part 20f that overlaps with the second insulating member 21 when viewed in the radial direction.

Second Embodiment

Next, with reference to FIG. 4 and FIGS. 22 to 31, a stator 200 according to a second embodiment will be described. In the stator 200 of the second embodiment, insulating members (121, 122) that are integrally formed are provided, unlike the stator 100 of the first embodiment that has the first insulating member 20 and the second insulating member 21 that are provided separately from each other. The same configurations as those in the first embodiment are indicated by the same reference numerals as those in the first embodiment and are shown in the drawings, and the description thereof will be omitted.

Structure of Stator

The structure of the stator 200 according to the second embodiment will be described with reference to FIG. 4 and FIGS. 22 to 31. The stator 200 is an example of the "armature" in the claims.

Figure 22:
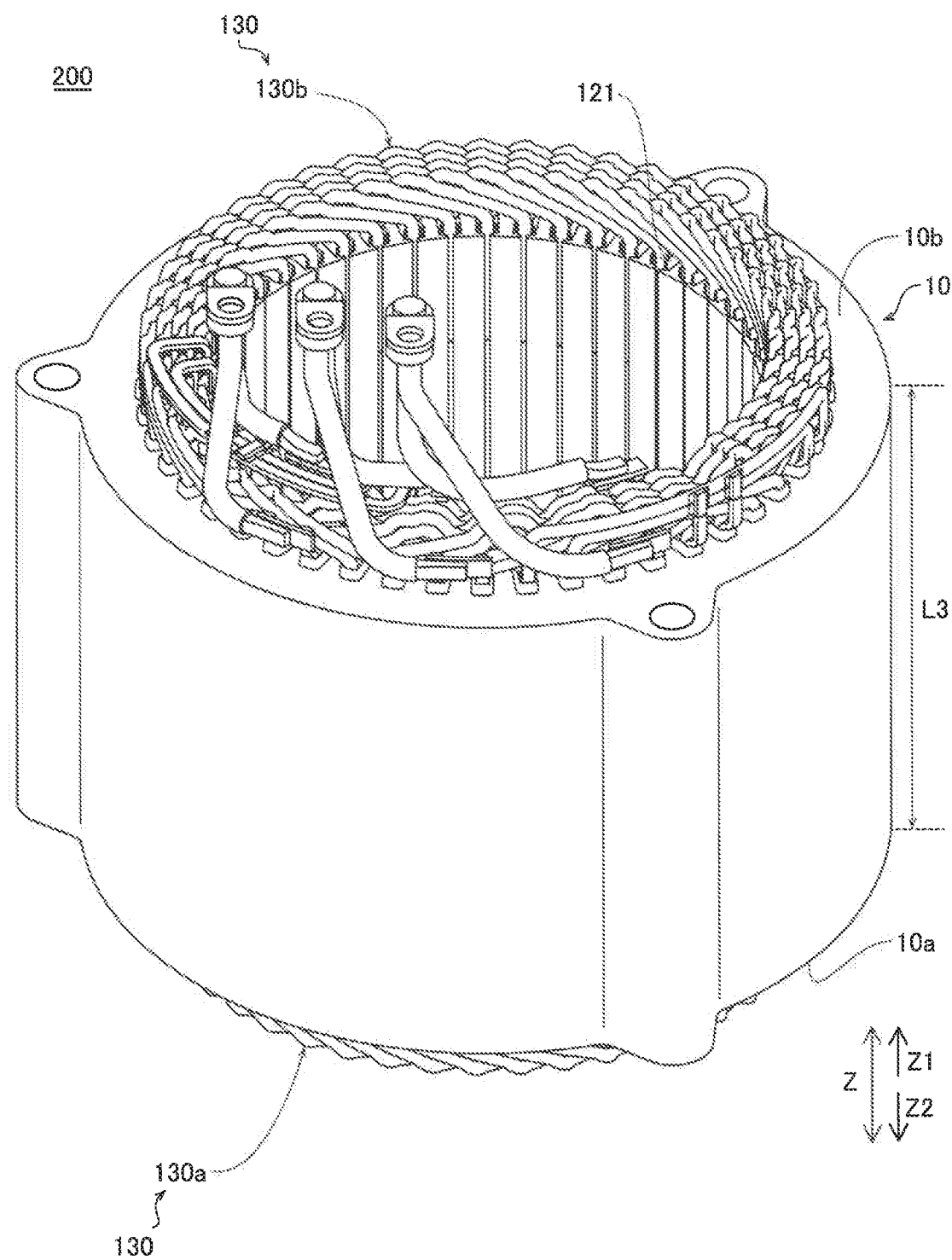
FIG. 22 is a perspective view showing the configuration of a stator according to a second embodiment.

As shown in FIG. 22, the stator 200 includes the sheet-shaped insulating member 121 and a coil portion 130. The coil portion 130 also includes a first coil assembly 130a (non-lead side coil) and a second coil assembly 130b (lead side coil). Further, the coil portion 130 is composed of a plurality of segment conductors 140 (see FIGS. 24A and 24B). The insulating member 121 is an example of a "joint portion insulating member" in the claims.

Figure 23:
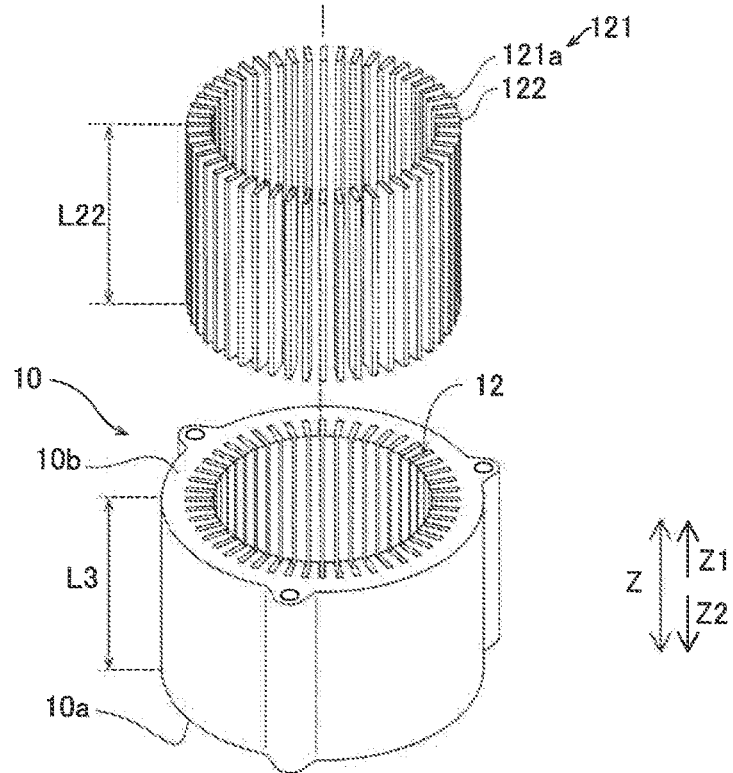
FIG. 23 is an exploded perspective view of the stator according to the second embodiment.

In addition, as shown in FIG. 23, in the central axis direction, the insulating member 121 (contact portion insulating part 121c described below) and the core leg portion insulating part 122 described below each have the same length L22. The length L22 is larger than the length L3 of the stator core 10 in the central axis direction. Note that, in FIG. 23, the illustration of the first conductor 70 and the second conductor 80 is omitted for simplification. In addition, in FIG. 23, each shape of the insulating member 121 and the core leg portion insulating part 122 are schematically illustrated.

(Configuration of Segment Conductor)

Figure 24A:
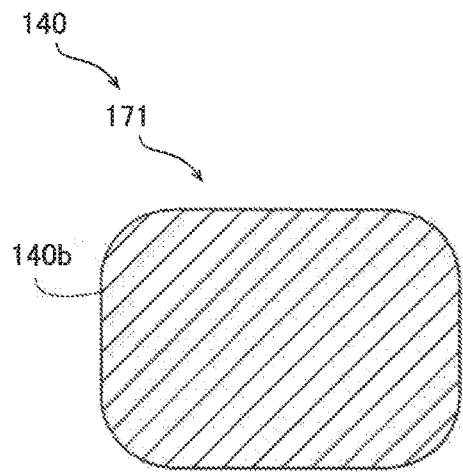
(FIG. 24A is a cross-sectional view of a leg portion.
Figure 24B:
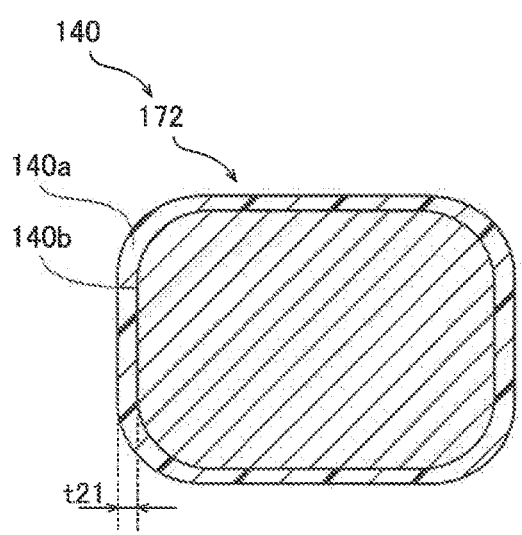
FIG. 24B is a cross-sectional view of a coil end portion.)

As shown in FIGS. 24A and 24B, the segment conductor 140 is configured as a flat conductor wire having a substantially rectangular cross section. In the segment conductor 140, a first leg portion 171 (second leg portion 181), which will be described below, is not covered with the insulating coating and a conductor surface 140b is exposed (see FIG. 24A). In contrast, in the segment conductor 140, an insulating coating 140a (see FIG. 24B) having a thickness t21 is provided on the conductor surface 140b of a first coil end portion 172 (second coil end portion 182) described below. For example, the thickness t21 of the insulating coating 140a is set to ensure an interphase insulating performance (insulation between the first coil end portions 172 and insulation between the second coil end portions 182 (see FIGS. 25A and B, and FIGS. 26A and B)). In FIGS. 24A and 24B, for the sake of explanation, the magnitude relationship such as the thickness is emphasized. However, the present disclosure is not limited to this illustrated example. In FIGS. 24A and 24B, only the first conductor 170 described below is shown. However, the second conductor 180 is similar, illustration thereof is omitted. The conductor surface 140b is an example of a "metal surface" in the claims.

<Structure of First Conductor and Second Conductor>

As shown in FIGS. 25A(B) and 26A(B), the plurality of segment conductors 140 includes a plurality of first conductors 170 disposed on one axial side (Z2 direction side) of the stator core 10 and a plurality of second conductors 180 disposed on the other axial side (Z1 direction side) of the stator core 10. The first conductor 170 and the second conductor 180 are disposed facing each other in the central axis direction. The first conductor 170 also includes the first leg portion 171 having a length L31 in the axial direction. The first leg portion 171 extends to the other side (Z1 direction side) in the central axis direction. The second conductor 180 also includes the second leg portion 181 having a length L32 in the axial direction. The second leg portion 181 extends to one side (Z2 direction side) in the central axis direction. The length L31 of the first leg portion 171 and the length L32 of the second leg portion 181 are substantially the same. Further, each of the first leg portion 171 and the second leg portion 181 is inserted in the slot 12. The first conductor 170 and the second conductor 180 are examples of the "first segment conductor" and the "second segment conductor" in the claims, respectively.

As shown in FIGS. 25A and 25B, the plurality of first conductors 170 is formed to have a U-shape (substantially U-shape) when viewed in the radial direction by connecting a pair of the first leg portions 171, which are disposed in different slots 12, to each other. The coil pitch of the first conductor 170 is six. That is, the first leg portions 171 are disposed at positions different in the circumferential direction by six slots 12. That is, five slots 12 are provided between the slot 12 in which one first leg portion 171 of the pair of first leg portions 171 is disposed and the slot 12 in which the other first leg portion 171 is disposed. Specifically, the first conductor 170 includes the pair of first leg portions 171, which are each disposed in different slots 12 and which are linearly formed along the axial direction, and the first coil end portion 172. The first leg portion 171 means a part disposed in the slot 12 from the axial position of the end surface 10a (see FIG. 2) in the central axis direction of the stator core 10, and the first coil end portion 172 means a part that is formed to be continuous with the first leg portion 171 and that is disposed on the outer axial side of the end surface 10a of the stator core 10. The first coil end portion 172 has a bent shape that bends in the axial direction. Further, the first coil end portion 172 has a first crank part 173 formed in a crank shape that is bent in a stepwise shape for a width of one segment conductor 140 in the radial direction when viewed in the axial direction. That is, the radial width of the first crank part 173 is twice the width of one segment conductor 140.

Further, the axial lengths L31 of the pair of first leg portions 171 are substantially equal to each other. An axial length L31 means the length of the part of the first conductor 170 that extends linearly in the central axis direction within the slot 12. The axial length L31 is smaller than the central axis direction length L3 (see FIG. 23) of the stator core 10 (slot 12).

Similarly, as shown in FIGS. 26A and 26B, the second conductor 180 includes a pair of the second leg portions 181 disposed in the slot 12 and the second coil end portion 182. Also, the second coil end portion 182 has a second crank part 183. The second conductor 180 is formed to have a U-shape by connecting the pair of second leg portions 181, which are disposed in different slots 12, to each other. The axial lengths L32 of the pair of second leg portions 181 of the second conductor 180 are substantially equal to each other. The axial length L32 means the length of the part of the second conductor 180 that extends linearly in the central axis direction within the slot 12.

Figure 27:
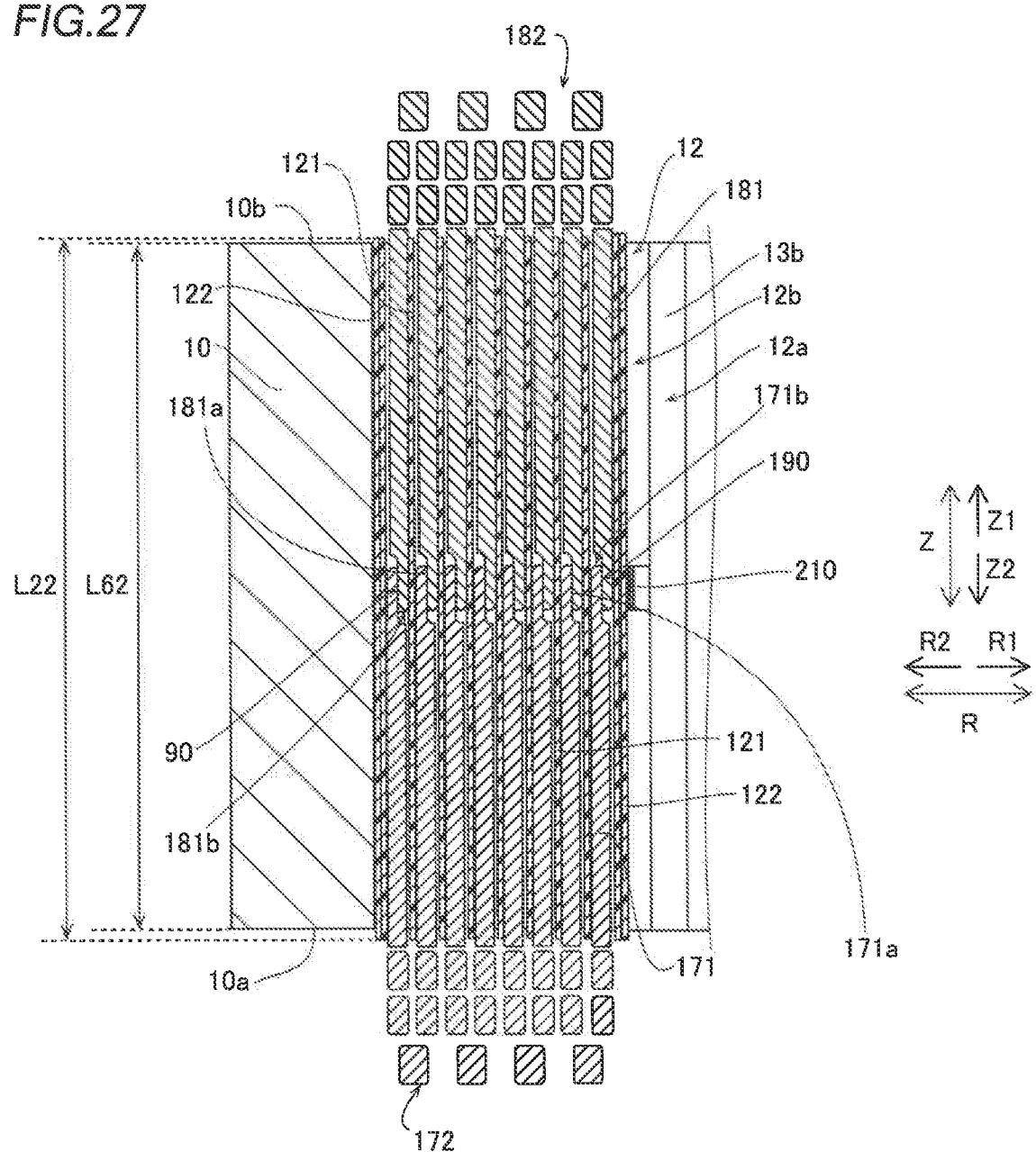
FIG. 27 is a cross-sectional view along the radial direction of the inside of a slot according to the second embodiment.

As shown in FIG. 27, the plurality of first leg portions 171 are provided in each of the plurality of slots 12 so that the first leg portions 171 are adjacent to each other in the radial direction of the stator core 10. In addition, the plurality of second leg portions 181 are provided in each of the plurality of slots 12 so that the second leg portions 181 are adjacent to each other in the radial direction of the stator core 10.

Further, in one slot 12, a plurality of first surfaces 171a provided on the first leg portions 171 and the second surfaces 181a provided on the second leg portions 181 are disposed alternately along the radial direction. Each first surface 171a is provided on a distal end portion 171b side of the first leg portion 171. Each second surface 181a is provided on a distal end portion 181b side of the second leg portion 181. The first surface 171a and the second surface 181a are provided so as to be in contact with each other as described below, and the first surface 171a and the second surface 181a that are in contact with each other are disposed so as to face each other in the radial direction.

Further, the stator 200 includes a spring member 210 that is provided in each of the plurality of slots 12 so as to be sandwiched between the coil portion 130 and the opening portion 12a (protruding portion 13b) of the slot 12. That is, the spring member 210 is provided in a distal end clearance 12b provided inside the slot 12 in the radial direction.

The spring member 210 is configured to press the coil portion 130 from the inner radial side of the coil portion 130 in the radial direction so that the first surface 171a of the first leg portion 171 of the first conductor 170 and the second surface 181a of the second leg portion 181 of the second conductor 180 are in contact with each other. A contact portion 190 is formed by contact between the first surface 171a of the first leg portion 171 and the second surface 181a of the second leg portion 181. The contact portion 190 is an example of a "joint portion" in the claims.

The first surface 171a and the second surface 181a are in contact with each other by being pressed by the spring member 210 without a bonding agent being interposed between the first surface 171a and the second surface 181a. That is, the first surface 171a and the second surface 181a are not joined, and the contact state between the first surface 171a and the second surface 181a is maintained by the pressing force of the spring member 210.

In addition, a plurality of sets (eight in the second embodiment) of the first surface 171a and the second surface 181a that are in contact with each other are provided in one slot 12. That is, a plurality of the contact portions 190 is provided in one slot 12. The contact portions 190 are disposed adjacent to each other in the radial direction within one slot 12.

In addition, a plurality of sets (eight in the second embodiment) of the first surface 171a and the second surface 181a that are in contact with each other are provided in one slot 12. That is, a plurality of the contact portions 190 is provided in one slot 12. The contact portions 190 are disposed adjacent to each other in the radial direction within one slot 12.

Here, in the second embodiment, each of the plurality of contact portions 190 is disposed within the slot 12, in a central portion in the central axis direction of the stator core 10. The spring member 210 is also disposed in the central portion of the stator core 10 in the central axis direction. Specifically, the spring member 210 is provided so as to overlap with each of the plurality of contact portions 190 when viewed in the radial direction.

Further, each of the first surface 171a and the second surface 181a is plated. That is, the plated surfaces (the first surface 171a and the second surface 181a) are in contact with each other.

In the plating process, metals such as nickel (Ni), silver (Ag), gold (Au), and tin (Sn) are used. The plating process may be performed using a plurality of metals (for example, Ni and Ag) among the above metals.

Figure 28:
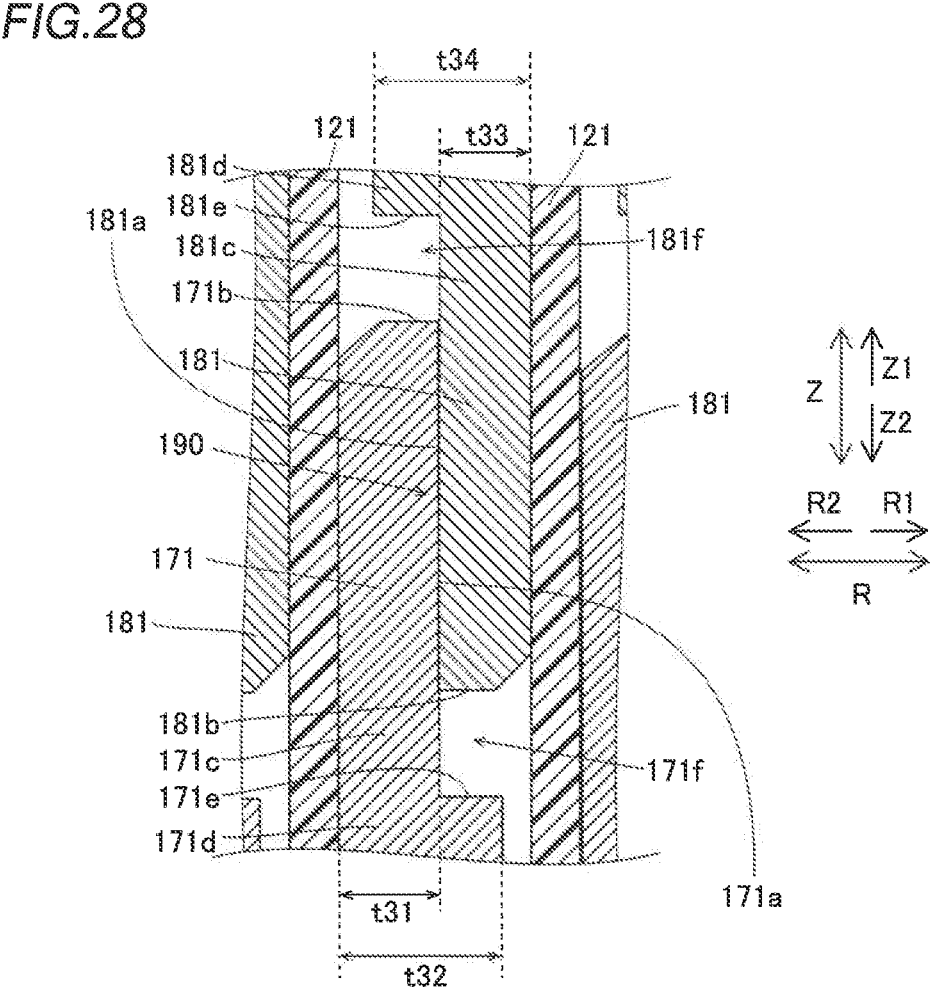
FIG. 28 is a partially enlarged view of a vicinity of a contact portion in FIG. 27.

As shown in FIG. 28, the first leg portion 171 includes a first surface forming portion 171c in which the first surface 171a is formed. The first surface forming portion 171c (first surface 171a) is provided so as to extend along the central axis direction. In addition, the first leg portion 171 includes a first leg body portion 171d that is provided on one side (Z2 direction side) in the central axis direction of the first surface forming portion 171c so as to be continuous from the first surface forming portion 171c. The first surface forming portion 171c has a radial thickness t31. The first leg body portion 171d has a radial thickness t32. The radial thickness t32 of the first leg body portion 171d is greater than the radial thickness t31 of the first surface forming portion 171c.

Further, the first leg portion 171 includes a first step portion 171e provided between the first surface forming portion 171c and the first leg body portion 171d. A clearance portion 171f is provided between the first step portion 171e and the distal end portion 181b of the second leg portion 181.

The second leg portion 181 includes a second surface forming portion 181c in which the second surface 181a is formed. The second surface forming portion 181c (second surface 181a) is provided so as to extend along the central axis direction. In addition, the second leg portion 181 includes a second leg body portion 181d that is provided on the other side (Z1 direction side) in the central axis direction of the second surface forming portion 181c so as to be continuous from the second surface forming portion 181c. The second surface forming portion 181c has a radial thickness t33. The second leg body portion 181d has a radial thickness t34. The radial thickness t34 of the second leg body portion 181d is greater than the radial thickness t33 of the second surface forming portion 181c.

The second leg portion 181 includes a second step portion 181e provided between the second surface forming portion 181c and the second leg portion main body portion 181d. A clearance portion 181f is provided between the second step portion 181e and the distal end portion 171b of the first leg portion 171.

The radial thickness t31 of the first surface forming portion 171c and the radial thickness t33 of the second surface forming portion 181c are substantially equal. The radial thickness t32 of the first leg body portion 171d and the radial thickness t34 of the second leg body portion 181d are substantially equal. Note that, in FIG. 28, in order to highlight the insulating member 121, the insulating member 121 is illustrated so as to have a thickness greater than the actual thickness.

Figure 29:
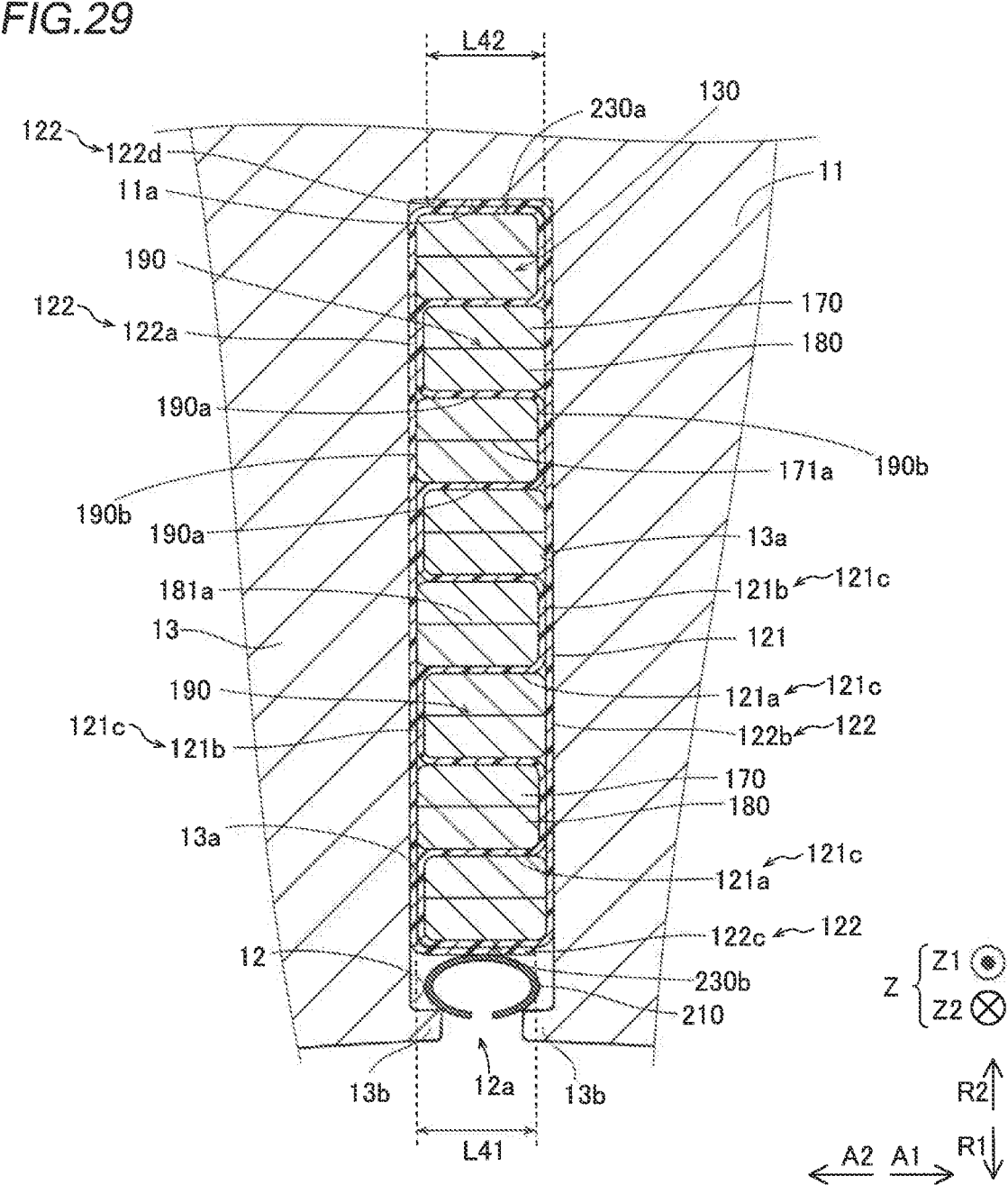
FIG. 29 is a sectional drawing showing a configuration of an insulating member according to the second embodiment.

Here, in the second embodiment, as shown in FIG. 29, between the coils adjacent to each other in the radial direction in one slot 12, the sheet-shaped insulating member 121 is provided so as to insulate the contact portions 190 from each other. Here, in each contact portion 190, the first leg portion 171 in which the conductor surface 140b is exposed and the second leg portion 181 in which the conductor surface 140b (see FIGS. 24A and 24B) is exposed are in contact without a bonding agent being interposed therebetween. Specifically, the insulating member 121 is provided between each of the plurality of (eight in the second embodiment) coils (a set of the first leg portion 171 and the second leg portion 181 that are in contact with each other) disposed in the radial direction in the slot 12.

Specifically, the insulating member 121 is formed by folding one sheet-shaped insulating member such as a Nomex. The insulating member 121 includes: facing surface insulating parts 121a that cover facing surfaces 190a of the contact portions 190 that are adjacent in the radial direction; and a circumferential surface insulating part 121b that is continuous from both end portions of the facing surface insulating part 121a in the circumferential direction and that covers one of the circumferential surfaces 190b of the contact portions 190 that are adjacent in the radial direction for at least the insulation distance. The facing surfaces 190a of the contact portions 190 mean an outer radial surface and an inner radial surface of the contact portions 190, which face each other in the radial direction. Further, the insulation distance is a length along the radial direction of the circumferential surface insulating part 121b and means a distance (creepage distance) sufficient for insulating the contact portions 190 adjacent to each other in the radial direction. The circumferential surfaces 190b mean surfaces of the contact portions 190 that intersect with the circumferential direction. In other words, the circumferential surfaces 190b mean surfaces extending in the radial direction and the axial direction.

In addition, the insulating member 121 includes the contact portion insulating parts 121c that are formed so that the following are continuous: the facing surface insulating part 121a on the outer radial side among a pair of the facing surface insulating parts 121a disposed adjacent to each other in the radial direction; the circumferential surface insulating part 121b provided on one side in the circumferential direction; the facing surface insulating part 121a on the inner radial side among the pair of the facing surface insulating parts 121a; and the circumferential surface insulating part 121b provided on the other side in the circumferential direction. The contact portion insulating part 121c is an example of the "joint portion insulating part" in the claims.

Here, in the second embodiment, the stator 200 includes the core leg portion insulating part 122 that is provided between the slot 12 and the coil portion 130 and that is integrally formed with the contact portion insulating part 121c. That is, the core leg portion insulating part 122 has a sheet shape similar to the contact portion insulating part 121c and is made of the same material as the contact portion insulating part 121c. Further, the contact portion insulating part 121c and the core leg portion insulating part 122 have the same thickness (not shown). The contact portion insulating part 121c and the core leg portion insulating part 122 have the same length L22 (see FIG. 27) in the central axis direction.

Specifically, the core leg portion insulating part 122 has the one side insulating part 122a that is continuous with the facing surface insulating part 121a on the outermost radial side and that is provided, on one side of the slot 12 in the circumferential direction (left side in FIG. 29), between the slot 12 (circumferential side surface 13a) and the coil portion 130 (circumferential surface 190b). Further, the core leg portion insulating part 122 has the other side insulating part 122b that is continuous with the facing surface insulating part 121a on the innermost radial side and that is provided, on the other side of the slot 12 in the circumferential direction (right side in FIG. 29), between the slot 12 (circumferential side surface 13a) and the coil portion 130 (circumferential surface 190b).

More specifically, in the one side insulating part 122a (other side insulating part 122b), the following parts are alternated along the radial direction: the part the is sandwiched between the circumferential side surface 13a of the slot 12 and the circumferential surface 190b of the coil portion 130; and the part sandwiched between the circumferential side surface 13a of the slot 12 and the circumferential surface insulating part 121b that covers the circumferential surface 190b of the coil portion 130.

Further, in the second embodiment, the one side insulating part 122a extends from an outer radial side end portion 230a of the coil portion 130 in the slot 12 to an inner radial side end portion 230b (so as to extend over the end portion 230b). The other side insulating part 122b extends from the inner radial side end portion 230b of the coil portion 130 in the slot 12 to the outer radial side end portion 230a (so as to extend over the end portion 230a). That is, the coil portion 130 in the slot 12 is provided so as to be surrounded by the facing surface insulating part 121a on the outermost radial side, the facing surface insulating part 121a on the innermost radial side, the one side insulating part 122a, and the other side insulating part 122b.

The core leg portion insulating part 122 includes an inner radial side insulating part 122c that is continuous with the one side insulating part 122a and that is provided so as to cover the facing surface insulating part 121a on the innermost radial side from the inner radial side. Further, the core leg portion insulating part 122 has an outer radial side insulating part 122d that is continuous with the other side insulating part 122b and that is provided so as to cover the facing surface insulating part 121a on the outermost radial side from the outer radial side.

Specifically, the inner radial side insulating part 122c is provided so as to be sandwiched between the facing surface insulating part 121a on the innermost radial side and the spring member 210. That is, the coil portion 130 and the spring member 210 are insulated from each other by the facing surface insulating part 121a on the innermost radial side and the inner radial side insulating part 122c. The outer radial side insulating part 122d is provided so as to be sandwiched between the facing surface insulating part 121a on the outermost radial side and the wall portion 11a of the slot 12. That is, the coil portion 130 and the wall portion 11a (stator core 10) of the slot 12 are insulated from each other by the facing surface insulating part 121a on the outermost radial side and the outer radial side insulating part 122d.

Further, the inner radial side insulating part 122c has a length L41 in the circumferential direction. Further, the outer radial side insulating part 122d has a length L42 in the circumferential direction. Each of the length L41 of the inner radial side insulating part 122c and the length L42 of the outer radial side insulating part 122d is greater than half the width W2 of the slot 12 (see FIG. 4), for example.

In the second embodiment, as shown in FIG. 27, the length L22 of each of the contact portion insulating part 121c (see FIG. 29) and the core leg portion insulating part (see FIG. 29) in the central axis direction is greater than a length L62 of the slot 12 in the central axis direction. The length L62 of the slot 12 in the central axis direction is equal to the length L3 of the stator core 10 in the central axis direction (see FIG. 22). In addition, each of the contact portion insulating part 121c and the core leg portion insulating part 122 is disposed so that edge portions on both sides in the central axis direction protrude outward from the end surfaces (10a, 10b) of the stator core 10 in the central axis direction. As a result, each of the contact portion insulating part 121c and the core leg portion insulating part 122 is provided across the entire slot 12, in the central axis direction.

Figure 30:
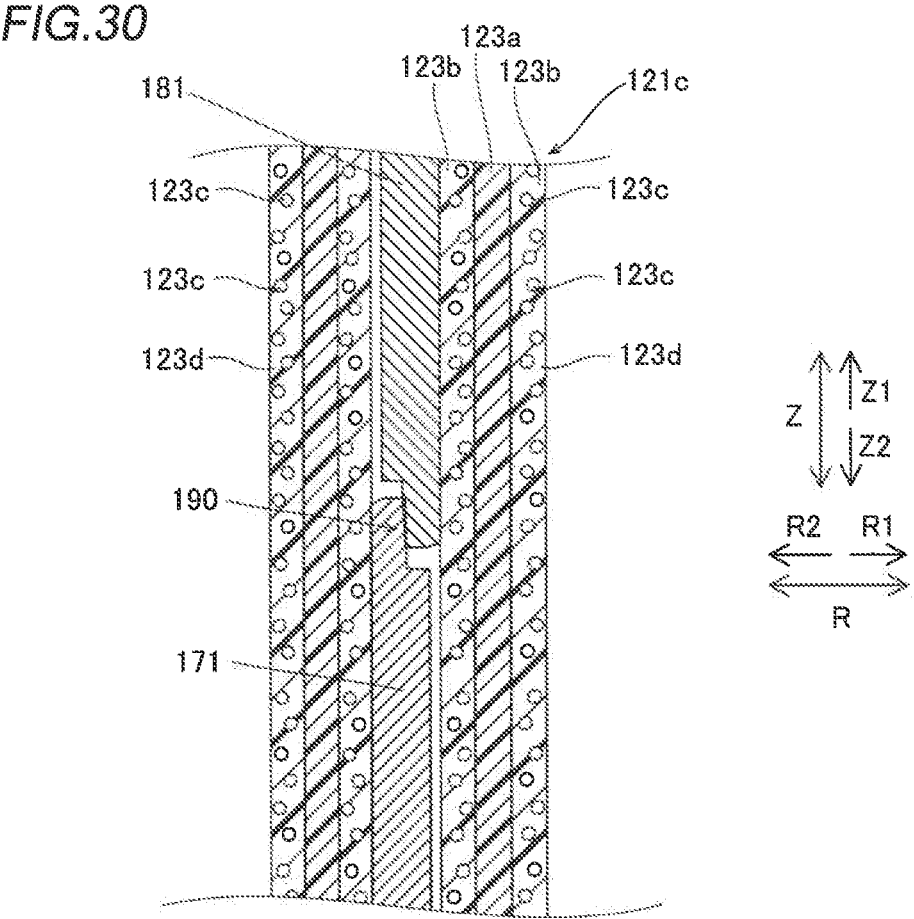
FIG. 30 is a sectional drawing showing a configuration of an insulating layer and a fixing layer of the contact portion insulation part according to the second embodiment.

Further, as shown in FIG. 30, the contact portion insulating part 121c includes an insulating layer 123a and a fixing layer 123b that includes a foaming agent 123c that foams due to heat. The foaming agent 123c foams and expands so as to fix a coil (a pair of the first leg portion 171 and the second leg portion 181 that are in contact with each other) in at least the central axis direction with respect to a coil adjacent in the circumferential direction. The fixing layer 123b is provided on both surfaces of the insulating layer 123a. When the fixing layer 123b is heated, a thermosetting resin 123d is cured. As a result, the fixing layer 123b of the contact portion insulating part 121c bonds the adjacent coils to each other to fix the coils. In FIG. 30, the illustration of the stator core 10 and the like is omitted for simplification. The insulating layer 123a and the fixing layer 123b are examples of a "fourth insulating layer" and a "fourth fixing layer" in the claims, respectively. The foaming agent 123c is an example of a "fourth foaming layer" in the claims.

Figure 31:
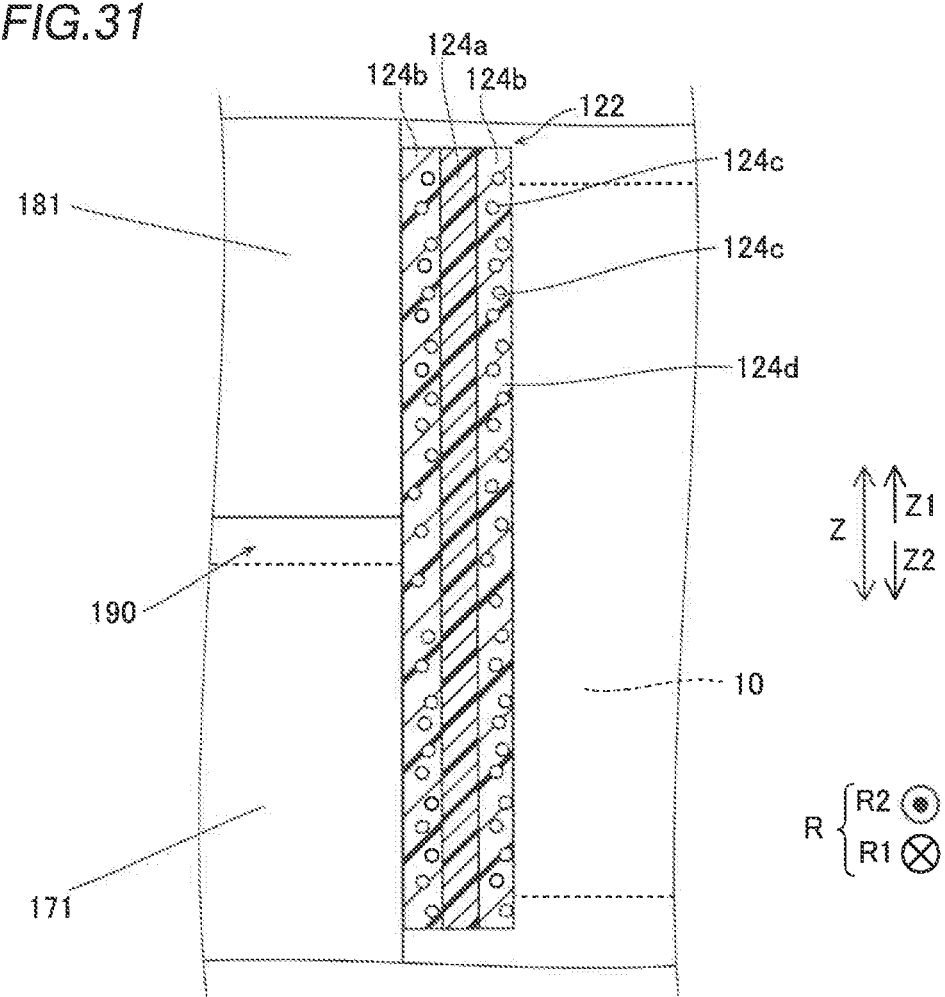
FIG. 31 is a sectional drawing showing a configuration of an insulating layer and a fixing layer of a core leg portion insulation part according to the second embodiment.

As shown in FIG. 31, the core leg portion insulating part 122 includes an insulating layer 124a and a fixing layer 124b that includes a foaming agent 124c that foams due to heat. The foaming agent 124c foams and expands so as to fix each of the first leg portion 171 and the second leg portion 181 in at least the central axis direction with respect to the stator core 10. The fixing layer 124b of the core leg portion insulating part 122 is configured to bond and fix each of the first leg portion 171 and the second leg portion 181 to the stator core 10. Thus, it is not necessary to use a varnish or the like to fix each of the first leg portion 171 and the second leg portion 181. Further, in FIGS. 30 and 31, the insulating member 121 and the core leg portion insulating part 122 are illustrated to have a thickness larger than the actual thickness so as to highlight the insulating member 121 and the core leg portion insulating part 122. Since the insulating layer 123a (124a) and the fixing layer 123b (124b) have the same configurations (materials) as the insulating layer 20a and the fixing layer 20c of the first embodiment, detailed description thereof will be omitted. The insulating layer 124a and the fixing layer 124b are examples of a "third insulating layer" and a "third fixing layer" in the claims, respectively. The foaming agent 124c is an example of a "third foaming layer" in the claims.

Here, in the second embodiment, the fixing layer 124b (fixing layer 123b) is provided so as to overlap with the entire surface of the insulating layer 124a (insulating layer 123a). Specifically, the fixing layer 124b (fixing layer 123b) is provided so as to overlap with the insulating layer 124a (insulating layer 123a) at a position in the central axis direction corresponding to the contact portion 190 and a position in the central axis direction corresponding to a part of the leg portion (171, 181) other than the contact portion 190.

(Stator Manufacturing Process)

Next, with reference to FIG. 32, a manufacturing process of the stator 200 will be described.

Figure 32:
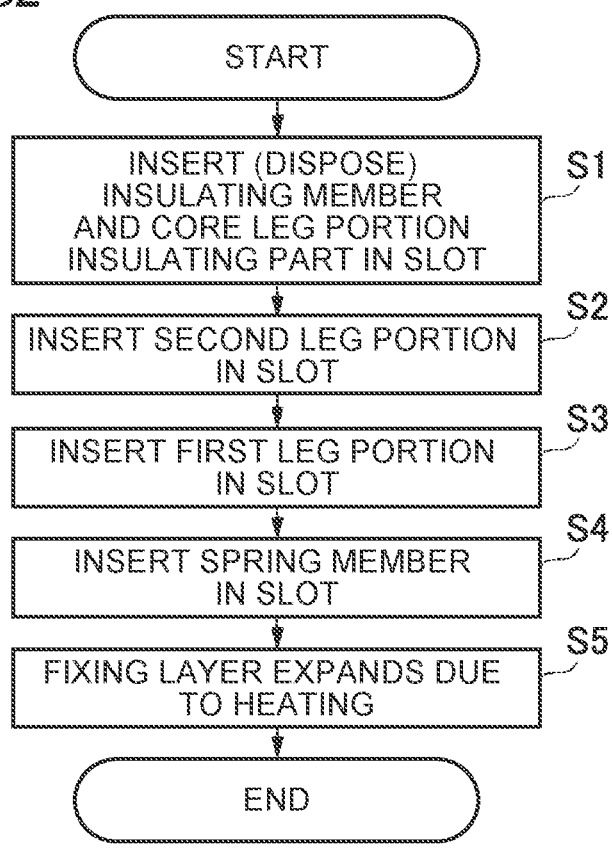
FIG. 32 is a flowchart showing a manufacturing method of the stator according to the second embodiment.

As shown in FIG. 32, first, in step S1, the insulating member 121 (contact portion insulating part 121c) and the core leg portion insulating part 122 are integrally inserted (placed) in the slot 12.

Next, in step S2, the second leg portion 181 (see FIG. 27) of the second conductor 180 is inserted in the slot 12 from the other side (Z1 direction side) in the central axis direction.

Next, in step S3, the first leg portion 171 (see FIG. 27) of the first conductor 170 is inserted in the slot 12 from one side (Z2 direction side) in the central axis direction. At this time, the first leg portion 171 is disposed so that the first surface 171a of the first leg portion 171 and the second surface 181a of the second leg portion 181 face each other.

Next, in step S4, the spring member 210 (see FIG. 27) is inserted in the slot 12 from the inner radial side through the opening portion 12a of the slot 12.

Then, in step S5, the stator core 10 is heated and the fixing layer 123b is heated and thus, the foaming agent 123c is foamed and the fixing layer 123b is expanded. In this way, the coil portion 130 is fixed to the slot 12 at least in the central axis direction.

The other configurations of the second embodiment are the same as those of the first embodiment.

Third Embodiment

Next, a stator 300 according to the third embodiment will be described with reference to FIGS. 33 to 37. In the stator 300 of the third embodiment, unlike the second embodiment in which the fixing layer 123b is provided on the entire surface of the insulating layer 123a, a fixing layer 223b is partially provided on an insulating layer 223a. The same components as those in the second embodiment are indicated in the drawings by the same reference numerals as those in the second embodiment and description thereof is omitted.

Structure of Stator

The structure of the stator 300 according to the third embodiment will be described with reference to FIGS. 33 to 37. The stator 300 is an example of the "armature" in the claims.

Figure 33:
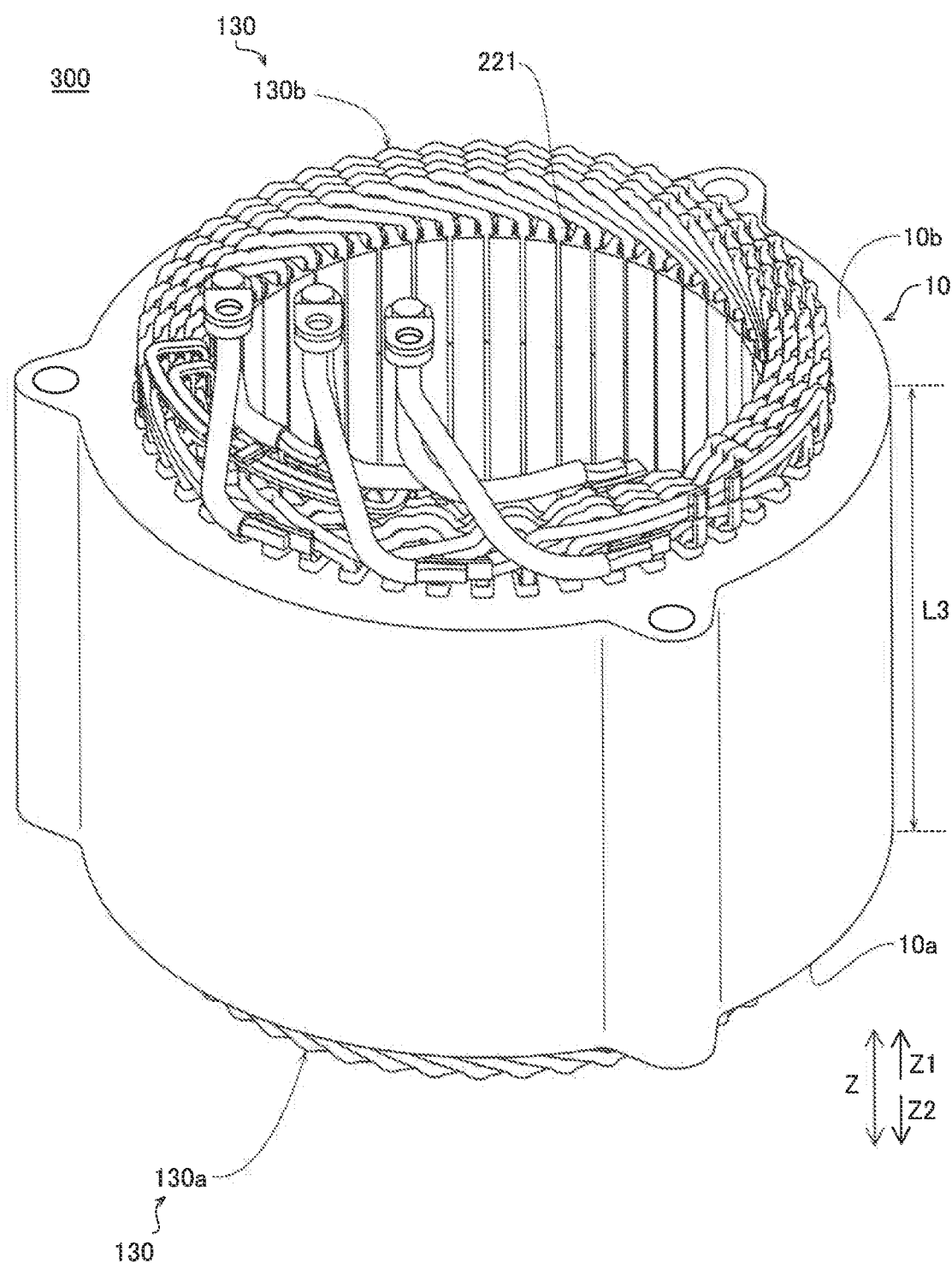
FIG. 33 is a perspective view showing a configuration of a stator according to a third embodiment.
Figure 34:
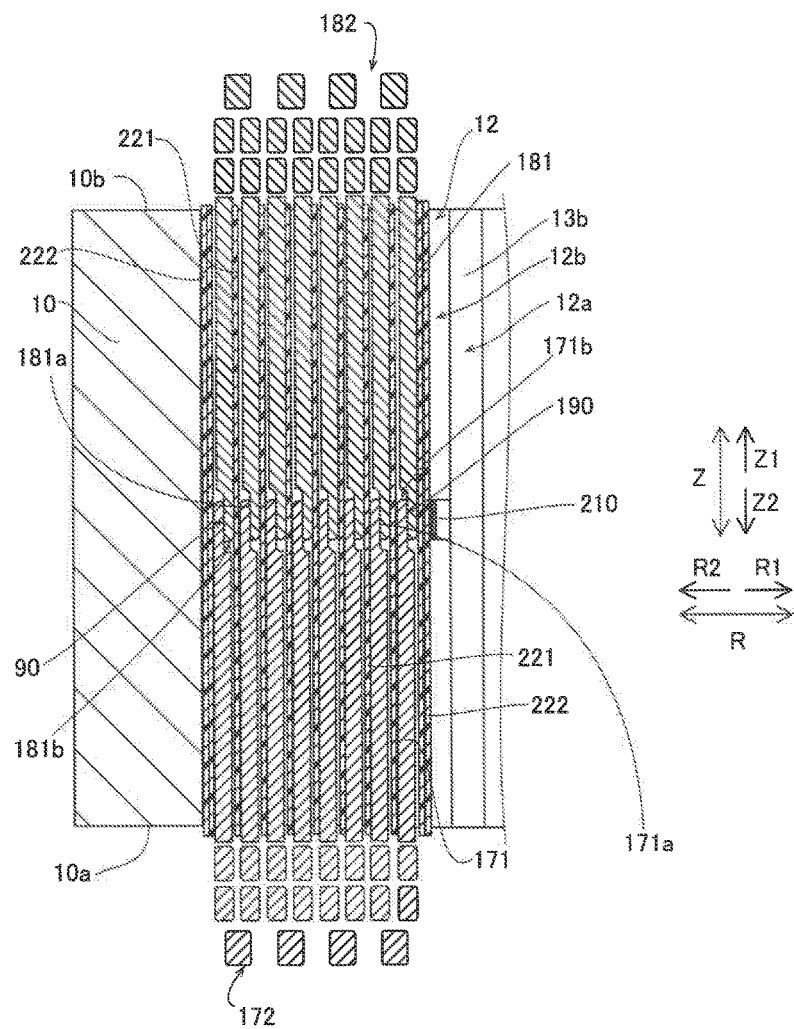
FIG. 34 is a cross-sectional view along the radial direction of the inside of a slot according to the third embodiment.

As shown in FIGS. 33 and 34, the stator 300 includes a sheet-shaped insulating member 221 and the coil portion 130. The insulating member 221 is an example of the "joint portion insulating member" in the claims.

Figure 35:
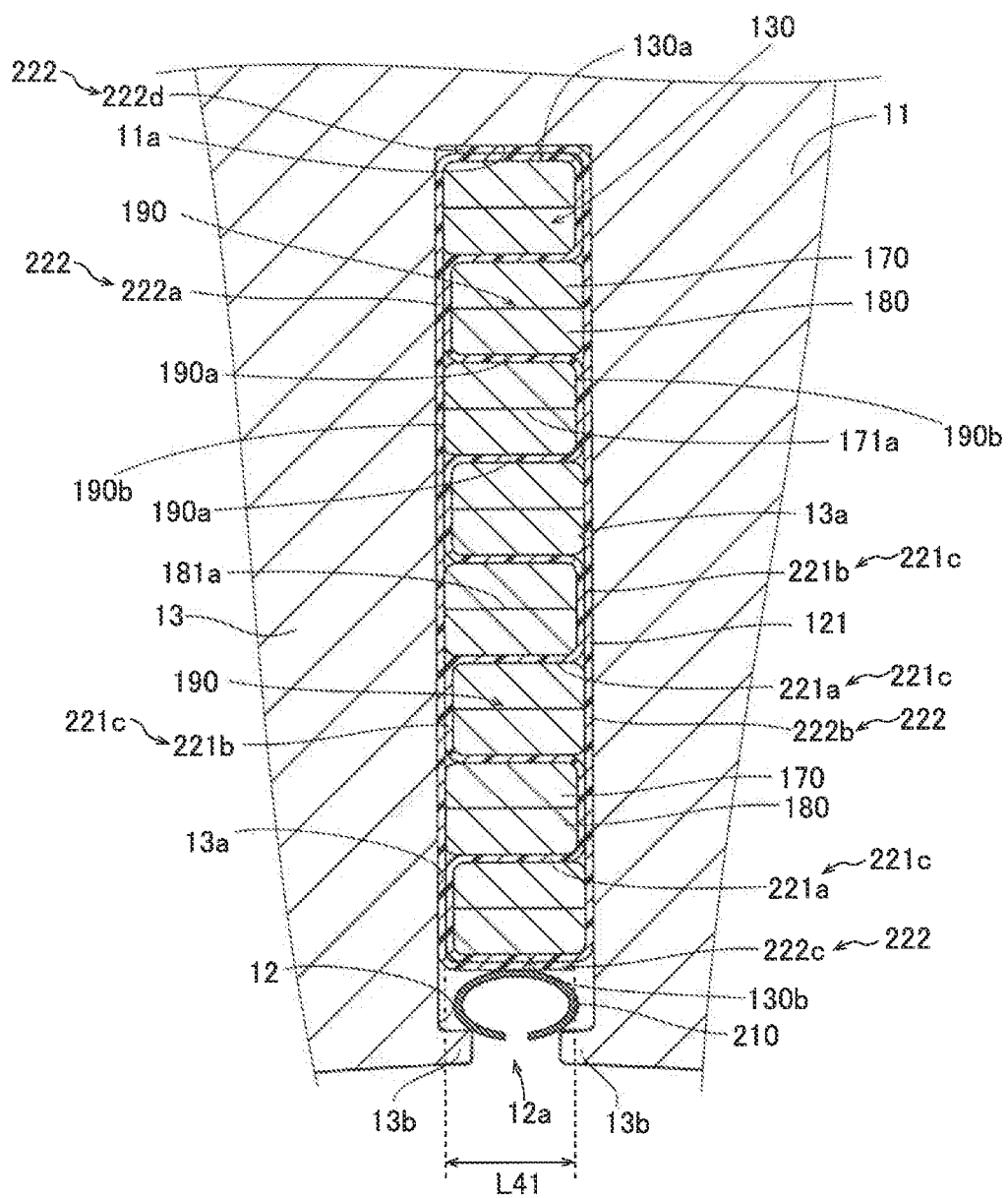
FIG. 35 is a sectional drawing showing a configuration of an insulating member according to the third embodiment.

As shown in FIG. 35, the insulating member 221 includes contact portion insulating parts 221c that are formed so that the following are continuous: a facing surface insulating part 221a on the outer radial side among a pair of the facing surface insulating parts 221a disposed adjacent to each other in the radial direction; a circumferential surface insulating part 221b provided on one side in the circumferential direction; the facing surface insulating part 221a on the inner radial side among the pair of facing surface insulating parts 221a; and the circumferential surface insulating part 221b provided on the other side in the circumferential direction. The contact portion insulating part 221c is an example of the "joint portion insulating part" in the claims.

Further, the stator 300 includes a core leg portion insulating part 222 that is provided between the slot 12 and the coil portion 130 and that is integrally formed with the contact portion insulating part 221c.

Specifically, the core leg portion insulating part 222 has a one side insulating part 222a that is continuous with the facing surface insulating part 221a on the outermost radial side and that is provided, on one side of the slot 12 in the circumferential direction (left side in FIG. 35), between the slot 12 (circumferential side surface 13a) and the coil portion 130 (circumferential surface 190b). Further, the core leg portion insulating part 222 has another side insulating part 222b that is continuous with the facing surface insulating part 221a on the innermost radial side and that is provided, on the other side of the slot 12 in the circumferential direction (right side in FIG. 35), between the slot 12 (circumferential side surface 13a) and the coil portion 130 (circumferential surface 190b).

The core leg portion insulating part 222 includes an inner radial side insulating part 222c that is continuous with the one side insulating part 222a and that is provided so as to cover the facing surface insulating part 221a on the innermost radial side from the inner radial side. Further, the core leg portion insulating part 222 has an outer radial side insulating part 222d that is continuous with the other side insulating part 222b and that is provided so as to cover the facing surface insulating part 221a on the outermost radial side from the outer radial side.

Figure 36:
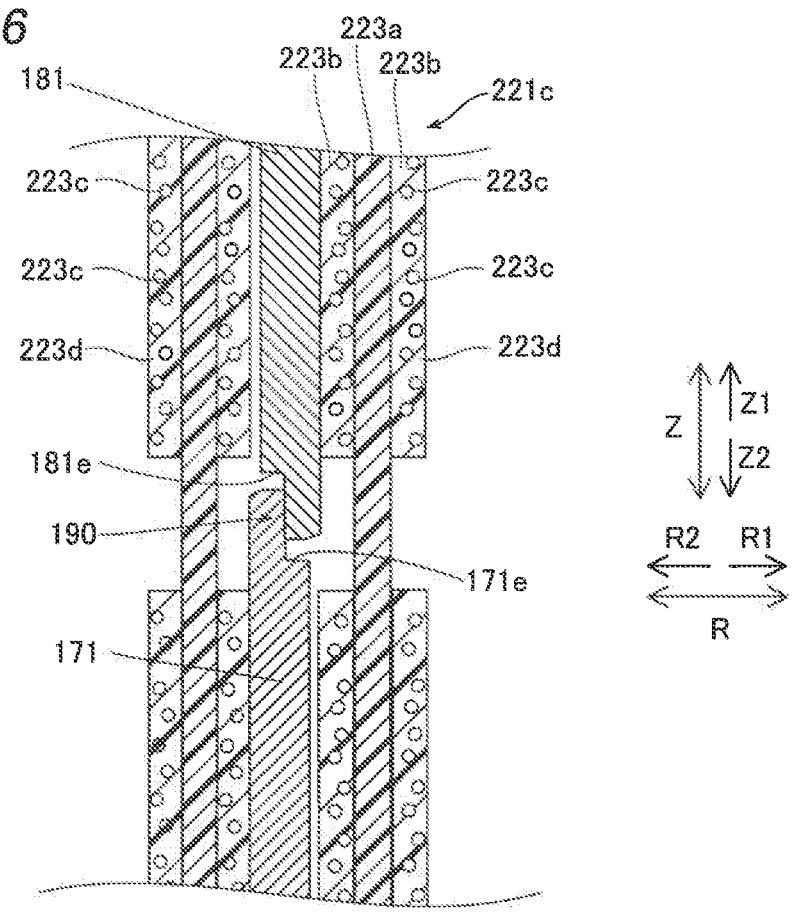
FIG. 36 is a sectional drawing showing a configuration of an insulating layer and a fixing layer of a contact portion insulation part according to the third embodiment.

Further, as shown in FIG. 36, the contact portion insulating part 221c includes the insulating layer 223a and the fixing layer 223b that includes a foaming agent 223c that foams due to heat. The foaming agent 223c foams and expands so as to fix a coil to a coil adjacent the radial direction. The fixing layer 223b is provided on both surfaces of the insulating layer 223a. When the fixing layer 223b is heated, a thermosetting resin 223d is cured. As a result, the fixing layer 223b of the contact portion insulating part 221c bonds and fixes the coils adjacent to each other. In FIG. 36, the illustration of the stator core 10 and the like is omitted for simplification. The insulating layer 223a and the fixing layer 223b are examples of a "second insulating layer" and a "second fixing layer" in the claims, respectively. The foaming agent 223c is an example of a "second foaming layer" in the claims.

Figure 37:
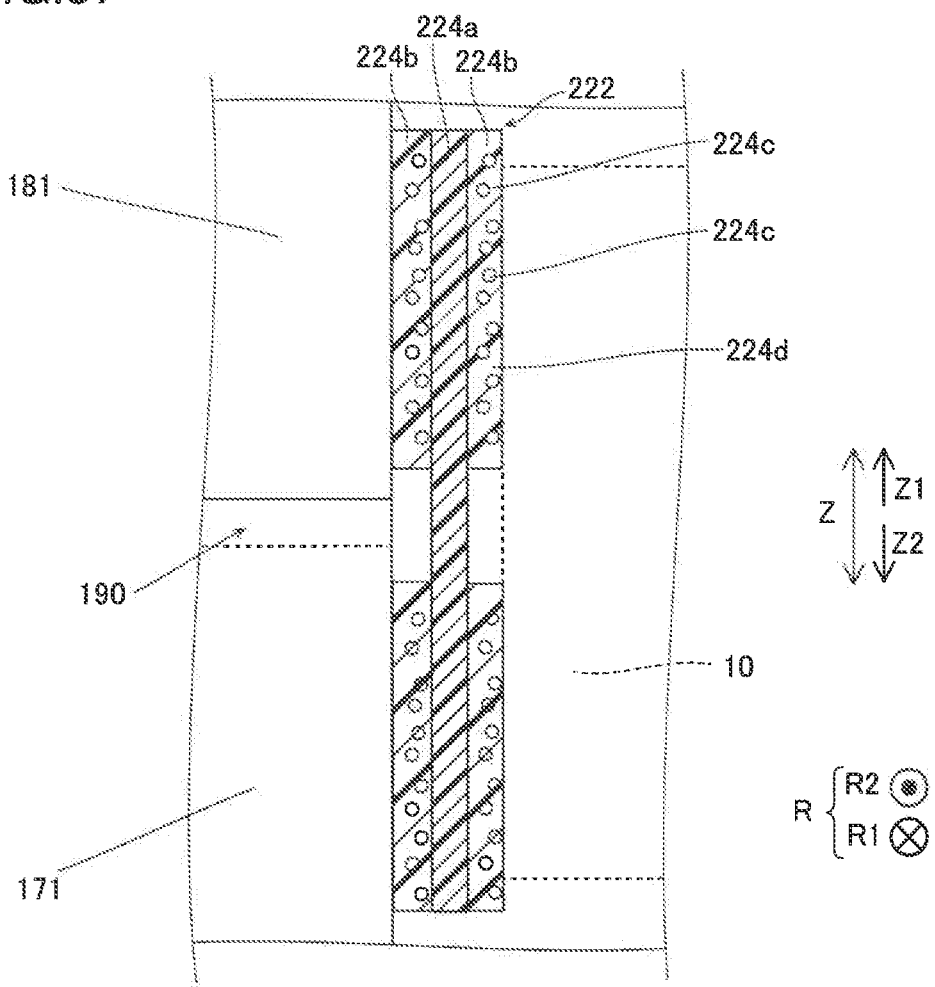
FIG. 37 is a sectional drawing showing a configuration of an insulating layer and a fixing layer of a core leg portion insulation part according to the third embodiment.

As shown in FIG. 37, the core leg portion insulating part 222 includes an insulating layer 224a and a fixing layer 224b that includes a foaming agent 224c that foams due to heat. The foaming agent 224c foams and expands so as to fix each of the first leg portion 171 and the second leg portion 181 in at least the central axis direction with respect to the stator core 10. The fixing layer 224b of the core leg portion insulating part 222 is configured to bond and fix each of the first leg portion 171 and the second leg portion 181 to the stator core 10. In FIGS. 36 and 37, the insulating member 221 and the core leg portion insulating part 222 are illustrated to have a thickness larger than the actual thickness so as to highlight the insulating member 221 and the core leg portion insulating part 222. The insulating layer 224a and the fixing layer 224b are examples of a "first insulating layer" and a "first fixing layer" in the claims, respectively. The foaming agent 224c is an example of a "first foaming layer" in the claims.

Here, in the third embodiment, the fixing layer 224b (fixing layer 223b) is provided so as to overlap with a part of the insulating layer 224a (insulating layer 223a) at a position different from a position in the central axis direction corresponding to the contact portion 190. In other words, in the core leg portion insulating part 222 (contact portion insulating part 221*c*), only the insulating layer 224*a* (insulating layer 223*a*) is provided at the position in the central axis direction corresponding to the contact portion 190. Specifically, the fixing layer 224*b* (fixing layer 223*b*) is provided separately into two parts that are a part on the one side (Z2 direction side) in the central axis direction with respect to the first step portion 171*e* (see FIG. 36) and a part on the other side (Z1 direction side) in the central axis direction with respect to the second step portion 181*e* (see FIG. 36).

The rest of the configuration of the third embodiment is similar to that of the second embodiment.

Effects of First to Third Embodiments

In the first to third embodiments, the following effects can be obtained.

In the first to third embodiments, as described above, since the joint portion insulating member (21, 121, 221) that insulates the joint portions (90, 190) from each other are sheet-shaped, the sheet-shaped insulating members can be bent so as to easily form the joint portion insulating member (21, 121, 221). As a result, the joint portions (90, 190) can be insulated from each other by the joint portion insulating member (21, 121, 221) that can be easily formed. The joint portion insulating member (21, 121, 221) includes the facing surface insulating part (21*a*, 121*a*, 221*a*) that covers the facing surface (90*a*, 190*a*) of the joint portions (90, 190) adjacent to each other in the radial direction, and the circumferential surface insulating part (21*b*, 121*b*, 221*b*) that is continuous from both end portions of the facing surface insulating part (21*a*, 121*a*, 221*a*) and that covers one of the circumferential surfaces (90*b*, 190*b*) of the joint portions (90, 190) adjacent to each other for at least a predetermined distance along the radial direction. Thus, the joint portions (90, 190) adjacent to each other in the radial direction are insulated by the joint portion insulating member (21, 121, 221). Further, since the facing surface insulating parts (21*a*, 121*a*, 221*a*) adjacent to each other in the radial direction are connected to each other by the circumferential surface insulating part (21*b*, 121*b*, 221*b*) in one or the other of the circumferential directions, the joint portion insulating member (21, 121, 221) can be easily expanded and contracted in the radial direction, unlike the case in which the facing surface insulating parts (21*a*, 121*a*, 221*a*) adjacent in the radial direction are connected by the circumferential surface insulating part (21*b*, 121*b*, 221*b*) in both circumferential directions. In addition, since the joint portion insulating member (21, 121, 221) has a sheet shape with a relatively thin thickness, the space factor of the coil portion (30, 130) in the slot (12) can be increased. The term "joint portion (90, 190)" has a broad meaning including not only the part joined via the bonding agent but also the part that is only in contact without the bonding agent.

In addition, in the first to third embodiments, as described above, the joint portion insulating member (21, 121, 221) is formed so that the following are continuous: the facing surface insulating part (21*a*, 121*a*, 221*a*) on an outer radial side among a pair of the facing surface insulating parts (21*a*, 121*a*, 221*a*) disposed adjacent to each other in the radial direction; the circumferential surface insulating part (21*b*, 121*b*, 221*b*) provided on one side in the circumferential direction; the facing surface insulating part (21*a*, 121*a*, 221*a*) on an inner radial side among the pair of facing surface insulating parts (21*a*, 121*a*, 221*a*); and the circumferential surface insulating part (21*b*, 121*b*, 221*b*) provided on another side in the circumferential direction. With such a configuration, since the facing surface insulating parts (21*a*, 121*a*, 221*a*) and the circumferential surface insulating parts (21*b*, 121*b*, 221*b*) can be integrally disposed in the slot in one step, the joint portion insulating member (21, 121, 221) can be easily disposed in the slot.

Further, in the first to third embodiments, as described above, the joint portion insulating member (21, 121, 221) is formed by folding one insulating member having a sheet shape. With such a configuration, the joint portion insulating member (21, 121, 221) can be expanded and contracted in the radial direction.

Further, in the first embodiment, as described above, the joint portion (90) in which the first segment conductor (70) and the second segment conductor (80) are joined is disposed in the slot (12) on one end portion side with respect to a center of the armature core (10) in the central axis direction, and a plurality of the joint portions (90) is configured so that the joint portions (90) overlap with each other when viewed in the radial direction. With such a configuration, the lengths (L1) of the first leg portions (71) of the plurality of first segment conductors (70) are substantially the same as each other and the lengths (L2) of the second leg portions (81) of the second segment conductors (80) are substantially the same as each other. In this way, the first segment conductors (70) and the second segment conductors (80) can be easily formed.

In the first embodiment, as described above, in the joint portion insulating member (21), an edge portion on one side in the central axis direction is disposed so as to protrude outward from the end surface (10*a*) of the armature core (10) in the central axis direction. With such a configuration, even when the joint portion (90) is disposed in the slot (12) near the end portion in the central axis direction, the creepage distance between the end surface (10*a*) of the armature core (10) and the joint portion (90) can be increased.

In the first embodiment, as described above, both the joint portion insulating member (21) and the core leg portion insulating member (20) are both disposed so as to protrude outward from the end surface (10*a*) of the armature core (10) in the central axis direction. With such a configuration, the end surface (10*a*) of the armature core (10) and the joint portion (90) can be insulated from each other by both the joint portion insulating member (21) and the core leg portion insulating member (20).

In the first embodiment, as described above, a length (L12) of the joint portion insulating member (21) is smaller than a length (L11) of the core leg portion insulating member (20) in the central axis direction. With such a configuration, the material forming the joint portion insulating member (21) can be reduced for the amount in which the length (L12) of the joint portion insulating member (21) is reduced.

In addition, in the first embodiment, as described above, a thickness (t11) of the part (20*f*) of the core leg portion insulating member (20) that overlaps with the joint portion insulating member (21) is smaller than a thickness (t12) of the part (20*b*) of the core leg portion insulating member (20) that does not overlap with the joint portion insulating member (21). With such a configuration, even when the core leg portion insulating member (20) and the joint portion insulating member (21) are disposed so as to overlap with each other, it is possible to prevent an increase in the total thickness of the core leg portion insulating member (20) and the joint portion insulating member (21). As a result, it is possible to prevent the first leg portion (71) and the second leg portion (81) disposed in the part (20*f*) in which the core leg portion insulating member (20) and the joint portion insulating member (21) overlap with each other from being curved with respect to the first leg portion (71) and the second leg portion (81) disposed in the part (20b) in which the core leg portion insulating member (20) and the joint portion insulating member (21) are not overlapped (being curved to the inner radial side).

In addition, in the second and third embodiments, as described above, each of the plurality of first segment conductors (170) includes a first leg portion (171) that extends toward the other side in the central axis direction, that is inserted in the slot (12), and in which a metal surface (140b) is exposed without being covered by an insulating coating. Each of the plurality of second segment conductors (180) includes a second leg portion (181) that extends to one side in the central axis direction, that is inserted in the slot (12), and in which a metal surface (140b) is exposed without being covered by an insulating coating. The joint portion insulating member (121, 221) that has the sheet shape is provided so as to insulate the joint portions (190) from each other, in which the first leg portion (171) having the exposed metal surface (140b) and the second leg portion (181) having the exposed metal surface (140b) are in contact without interposing a bonding agent, between the coils that are radially adjacent to each other in the one slot (12). With such a configuration, the coil end portions (172, 182) are insulated from each other by the insulating coating (140a) and the leg portions (171, 181) (joining portions (190)) are insulated by the joint portion insulating member (121, 221). Thus, the coil end portions (172, 182) and the leg portions (171, 181) can be insulated from each other by different members. In this way, the thickness of each of the insulating coating (140a) of the coil end portions (172, 182) and the joint portion insulating member (121, 221) can be individually adjusted. As a result, even when the voltages applied to the coil end portions (172, 182) and the leg portions (171, 181) are different from each other, it is possible to appropriately insulate the coil end portions (172, 182) and the leg portions (171, 181) by adjusting the thickness of each of the insulating coating (140a) and the joint portion insulating members (121, 221).

In addition, since the joint portion insulating member (121, 221) is sheet-shaped and has flexibility compared with a rigid body, it is possible to easily transmit the pressing force from the inner radial side to the entirety of the joint portions (190) arranged in the radial direction, when the first leg portion (171) and the second leg portion (181) are brought into contact.

In the second and third embodiments, as described above, the joint portion insulating member (121, 221) includes a joint portion insulating part (121c, 221c) that is formed so that the following are continuous: the facing surface insulating part (121a, 221a) on an outer radial side among a pair of facing surface insulating parts (121a, 221a) disposed adjacent to each other in the radial direction; the circumferential surface insulating part (121b, 221b) provided on one side in the circumferential direction; the facing surface insulating part (121a, 221a) on an inner radial side among the pair of facing surface insulating parts (121a, 221a); and the circumferential surface insulating part (121b, 221b) provided on another side in the circumferential direction. The armature (200, 300) has the core leg portion insulating part (122, 222) that is provided between the slot (12) and the coil portion (130), and that is integrally formed with the joint portion insulating part (121c, 221c). With such a configuration, since the joint portion insulating part (121c, 221c) and the core leg portion insulating part (122, 222) can be integrally disposed in the slot (12) in one step, the joint portion insulating part (121c, 221c) and the core leg portion insulating part (122, 222) can be easily disposed in the slot (12) in one step.

In addition, in the second and third embodiments, as described above, the core leg portion insulating part (122, 222) has one side insulating part (122a, 222a) that is continuous with the facing surface insulating part (121a, 221a) on an outermost radial side and that is provided between the slot (12) and the coil portion (130), on one side of the slot (12) in the circumferential direction. The core leg portion insulating part (122, 222) has another side insulating part (122b, 222b) that is continuous with the facing surface insulating part (121a, 221a) on the innermost radial side and that is provided between the slot (12) and the coil portion (130), on the other side of the slot (12) in the circumferential direction. With such a configuration, it is possible to prevent conduction of the slot (12) (armature core (10)) and the coil portion (130) in the circumferential direction by each of the one side insulating part (122a, 222a) and the other side insulating part (122b, 222b). Further, since each of the one side insulating part (122a, 222a) and the other side insulating part (122b, 222b) is continuous with the joint portion insulating part (121c, 221c), the one side insulating part (122a, 222a) and the other side insulating part (122b, 222b) can be disposed in the slot (12) at the same time as the joint portion insulating part (121c, 221c).

In the second and third embodiments, as described above, the one side insulating part (122a, 222a) extends from an end portion (230a) on an outer radial side to an end portion (230b) on an inner radial side of the coil portion (130) in the slot (12), and the other side insulating part (122b, 222b) extends from the end portion (230b) on the inner radial side to the end portion (230a) on the outer radial side of the coil portion (130) in the slot (12). With such a configuration, it is possible to more surely prevent conduction of the slot (12) (armature core (10)) and the coil portion (130) in the circumferential direction by each of the one side insulating part (122a, 222a) and the other side insulating part (122b, 222b).

In the second and third embodiments, as described above, the core leg portion insulating part (122, 222) has an inner radial side insulating part (122c, 222c) that is continuous with the one side insulating part (122a, 222a) and that is provided so as to cover the facing surface insulating part (121a, 221a) on the innermost radial side from the inner radial side, and an outer radial side insulating part (122d, 222d) that is continuous with the other side insulating part (122b, 222b) and that is provided so as to cover the facing surface insulating part (121a, 221a) on the outermost radial side from the outer radial side. With such a configuration, it is possible to more surely prevent conduction of the coil portion (130) with the slot (12) (armature core (10)) and the like via the end portions (230a, 230b) on both sides of the coil portion (130) in the radial direction, with the inner radial side insulating part (122c, 222c) and the outer radial side insulating part (122d, 222d).

Further, it is possible to prevent the joint portion insulating part (121c, 221c) from expanding in the radial direction and deforming, since the joint portion insulating part (121c, 221c) is sandwiched in the radial direction by the inner radial side insulating part (122c, 222c) and the outer radial side insulating part (122d, 222d). As a result, the work of inserting the joint portion insulating part (121c, 221c) into the slot (12) can be facilitated.

In the second and third embodiments, as described above, each length (L22) of the joint portion insulating part (121c, 221c) and the core leg portion insulating part (122, 222) in the central axis direction is greater than a length (L62) of the slot (12) in the central axis direction. Each of the joint portion insulating part (121c, 221c) and the core leg portion insulating part (122, 222) is disposed so that edge portions on both sides in the central axis direction protrude outward from an end surface (10a, 10b) of the armature core (10) in the central axis direction. With such a configuration, since each of the joint portion insulating part (121c, 221c) and the core leg portion insulating part (122, 222) is provided in the entire slot (12) in the central axis direction, it is possible to more surely insulate the leg portions (171, 181) from each other (the joint portions (190) from each other) with the joint portion insulating part (121c, 221c), and it is also possible to more surely insulate the leg portions (171, 181) and the slot (12) (armature core (10)) with the core leg portion insulating part (122, 222).

In the third embodiment, as described above, the core leg portion insulating part (222) includes a first insulating layer (224a) and a first fixing layer (224b) that has a first foaming agent (224c) that foams due to heat and in which the first foaming agent (224c) foams and expands to fix each of the first leg portion (171) and the second leg portion (181) to the armature core (10) in at least the central axis direction. The first fixing layer (224b) is provided so as to overlap with a part of the first insulating layer (224a) at a position different from a position in the central axis direction corresponding to the joint portion (190). With such a configuration, it is possible to prevent the first fixing layer (224b) from entering between the first leg portion (171) and the second leg portion (181) due to expansion of the first fixing layer (224b).

In the third embodiment, as described above, the joint portion insulating part (221c) includes a second insulating layer (223a) and a second fixing layer (223b) that has a second foaming agent (223c) that foams due to heat and in which the second foaming agent (223c) foams and expands to fix the coil to the coil adjacent in the radial direction in at least the central axis direction. The second fixing layer (223b) is provided so as to overlap with a part of the second insulating layer (223a) at a position different from a position in the central axis direction corresponding to the joint portion (190). With this structure, it is possible to prevent the second fixing layer (223b) from entering the joint portion (190) (for example, a clearance portion (171f, 181f)) due to the expansion of the second fixing layer (223b).

In the second embodiment, as described above, the core leg portion insulating part (122) includes a third insulating layer (124a) and a third fixing layer (124b) that has a third foaming agent (124c) that foams due to heat and in which the third foaming agent (124c) foams and expands to fix each of the first leg portion (171) and the second leg portion (181) to the armature core (10) in at least the central axis direction. The third fixing layer (124b) is provided over an entire surface of the third insulating layer (124a). With such a configuration, compared to the case in which the third fixing layer (124b) is provided so as to overlap with only a part of the third insulating layer (124a), each of the first leg portion (171) and the second leg portion (181) can be stably fixed with respect to the armature core (10) by the third fixing layer (124b).

In the second embodiment, as described above, the joint portion insulating part (121c) includes a fourth insulating layer (123a) and a fourth fixing layer (123b) that has a fourth foaming agent (123c) that foams due to heat and in which the fourth foaming agent (123c) foams and expands to fix the coil to the coil adjacent in the radial direction in at least the central axis direction. The fourth fixing layer (123b) is provided so as to overlap with an entire surface of the fourth insulating layer (123a). With such a configuration, compared to the case in which the fourth fixing layer (123b) is provided so as to overlap with only a part of the fourth insulating layer (123a), the coils adjacent to each other can be more stably fixed by the fourth fixing layer (123b).

In the second and third embodiments, as described above, each of a plurality of the joint portions (190) is disposed within the slot (12), in a central portion in the central axis direction of the armature core (10). With such a configuration, it is possible to prevent one of the first leg portion (171) and the second leg portion (181) from becoming excessively heavier than the other. As a result, it is possible to prevent the first leg portion (171) or the second leg portion (181) from becoming too heavy to be fixed by the fixing layer (124b, 224b).

In the first to third embodiments, as described above, the circumferential surface insulating part (21b, 121b, 221b) is provided so as to cover one of the circumferential surfaces (190b) of the joint portions (90, 190) adjacent in the radial direction for at least an insulation distance serving as the predetermined distance along the radial direction. With such a configuration, it is possible to more surely insulate the joint portions (90, 190) from each other with the circumferential surface insulating part (21b, 121b, 221b).

In the first to third embodiments, as described above, the facing surface insulating part (21a, 121a, 221a) of the joint portion insulating member (21, 121, 221) is provided so as to overlap with an entire surface of the facing surface (190a) of the joint portion (90, 190) when viewed in the radial direction. With such a configuration, it is possible to ensure the joint portions (90, 190) from each other even further with the facing surface insulating part (21a, 121a, 221a).

In addition, in the first to third embodiments, as described above, the circumferential surface insulating part (21b, 121b, 221b) of the joint portion insulating member (21, 121, 221) is provided so as to overlap with the circumferential surface (190b) of the joint portion (90, 190) when viewed from the circumferential direction. With such a configuration, it is possible to more surely insulate the circumferential surface (190b) of the joint portion (90, 190) and the slot (12) (armature core (10)) with the circumferential surface insulating part (21b, 121b, 221b).

Modifications

It should be considered that the embodiments presently disclosed are exemplifications in all points and are not restrictive. The scope of the present disclosure is shown by the scope of the claims and not by the above description of the embodiments, and further includes the meanings equivalent to the scope of the claims and all changes (modifications) within the scope.

Figure 38:
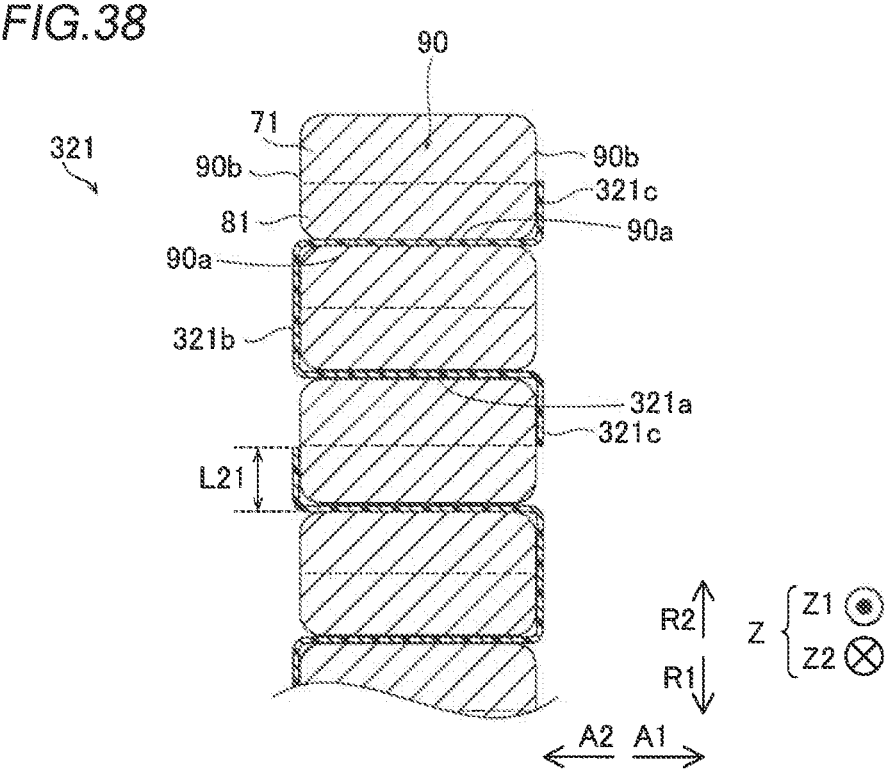
FIG. 38 is a sectional drawing of a second insulating member when viewed from above according to a first modification of the first embodiment.

For example, in the above-described embodiment, an example is shown in which the facing surface insulating parts that are disposed so as to be adjacent to each other in the radial direction are alternately connected by the circumferential surface insulating part on one side and the other side in the circumferential direction (that is, the second insulating members are integrally formed). However, the present disclosure is not limited to this. For example, as in a second insulating member 321 according to a first modification shown in FIG. 38, facing surface insulating parts 321a may be connected to each other in one (or the other) circumferential direction by a circumferential surface insulating part 321b, and may be connected to each other in the other (or one) circumferential direction by a circumferential surface insulating part 321c that extends in the R1 direction (or the R2 direction) for only an insulation distance L21. In this case, a plurality of second insulating members 321 are provided in one slot 12. The second insulating member 321 is an example of the "joint portion insulating member" in the claims. Further, the insulating members (121, 221) of the second and third embodiments may have the same shape.

Figure 39:
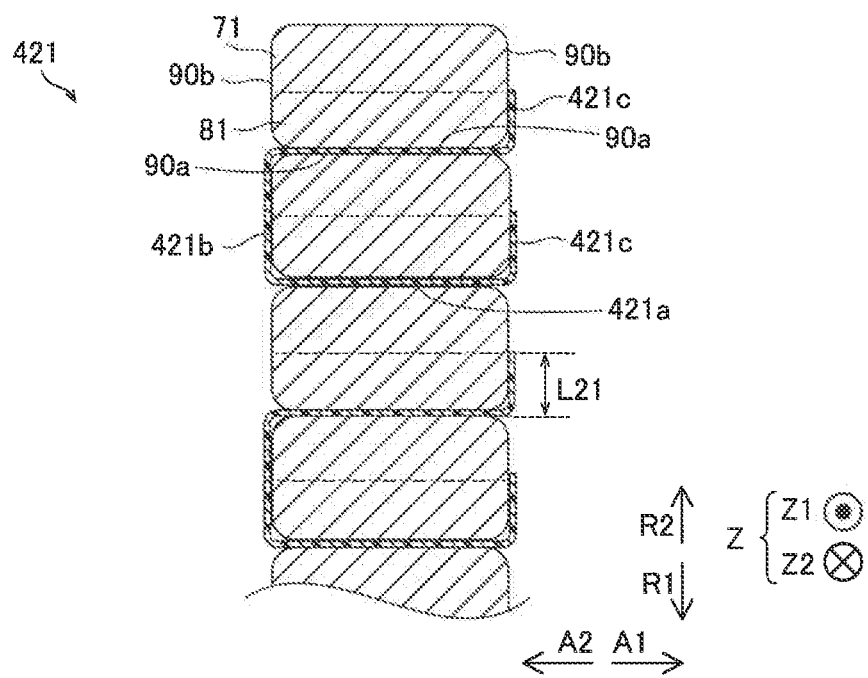
FIG. 39 is a sectional drawing of a second insulating member when viewed from above according to a second modification of the first embodiment.

As in a second insulating member 421 according to a second modification shown in FIG. 39, facing surface insulating parts 421a may be connected to each other in one circumferential direction by a circumferential surface insulating part 421b, and may be connected to each other in the other circumferential direction by a circumferential surface insulating part 421c that extends in the R2 direction for only the insulation distance L21. Also in this case, a plurality of the second insulating members 421 is provided in one slot 12. The second insulating member 421 is an example of the "joint portion insulating member" in the claims. Further, the insulating members (121, 221) of the second and third embodiments may have the same shape.

In the above-described first embodiment, an example is shown in which the joining portion in which the first segment conductor and the second segment conductor are joined is disposed in the vicinity of the end portion on the Z2 direction side in the slot. However, the present disclosure is not limited to this. For example, the joint portion may be disposed in the slot near the central portion in the central axis direction or near the end portion on the Z1 direction side. In the second and third embodiments described above, the contact portion may be disposed in the slot near the end portion on the Z1 direction side or the Z2 direction side.

Further, in the above-described first to third embodiments, an example is shown in which all the joint portions (contact portions) disposed in one slot are configured to overlap with each other when viewed in the radial direction. However, the present disclosure is not limited to this. In the present disclosure, the configuration only needs to be such that the joint portions (contact portions) adjacent in the radial direction at least overlap with each other when viewed in the radial direction. For example, in one slot, the joint portion (contact portion) disposed on the innermost radial side and the joint portion (contact portion) disposed on the outermost radial side may not overlap with each other when viewed in the radial direction.

In the above-described first embodiment, an example is shown in which the second insulating member is disposed so as to protrude outward from the end surface of the stator core in the central axis direction. However, the present disclosure is not limited to this. For example, the second insulating member may be disposed so as not to protrude outward from the end surface of the stator core in the central axis direction. Also in the second and third embodiments, the edge portion of the insulating member may not protrude from the end surface of the stator core in the central axis direction.

In the first embodiment, an example is shown in which the thickness of the part of the first insulating member that overlaps with the second insulating member is smaller than the thickness of the part of the first insulating member that does not overlap with the second insulating member. However, the present disclosure is not limited to this. For example, the thickness of the part of the first insulating member that overlaps with the second insulating member and the thickness of the part of the first insulating member that does not overlap with the second insulating member may be substantially the same.

In the above-described first embodiment, an example is shown in which the first segment conductor and the second segment conductor are joined in the slot. However, the present disclosure is not limited to this. For example, the first segment conductor and the second segment conductor may be joined to each other on the outer side of the slot in the central axis direction.

In the above-described first embodiment, an example is shown in which the second insulating member covers the outer radial side of the joint portion disposed on the outermost radial side and the inner radial side of the joint portion disposed on the innermost radial side. However, the present disclosure is not limited to this. For example, the second insulating member may not cover one (or both) of the outer radial side of the joint portion disposed on the outermost radial side and the inner radial side of the joint portion disposed on the innermost radial side.

Moreover, in the first embodiment described above, an example is shown in which the first insulating member and the second insulating member are provided separately. However, the disclosure is not limited to this. For example, the first insulating member and the second insulating member may be integrally provided.

In the above-described first embodiment, an example is shown in which the first insulating member including the fixing layer configured as the adhesive layer is used. However, the present disclosure is not limited to this. For example, by using a first insulating member including an expansive material (expansion layer) different from the adhesive layer, the wall portion and the circumferential side surface and the second leg portion may be pressed against each other (pressing force), without being adhered, to be fixed. Similarly, in the second and third embodiments, the fixing layer may not have the adhesive force.

In the second and third embodiments, an example is shown in which the contact portion insulating part and the core leg portion insulating part are integrally formed. However, the present disclosure is not limited to this. The contact portion insulating part and the core leg portion insulating part may be provided separately (individually).

In the second and third embodiments, an example is shown in which the one side insulating part and the inner radial side insulating part are continuous and the other side insulating part and the outer radial side insulating part are continuous. However, the present disclosure is not limited to this. At least one of the one side insulating part and the inner radial side insulating part and the other side insulating part and the outer radial side insulating part may be provided separately (individually).

In the second and third embodiments described above, an example is shown in which the fixing layer is provided up to the edge portion of the insulating layer. However, the present disclosure is not limited to this. For example, the fixing layer may be provided only on the part of the insulating layer housed in the slot.

DESCRIPTION OF REFERENCE NUMERALS

10 Stator core (armature core)
10a, 10b End surface
12 Slot
20 First insulating member (core leg portion insulating member)
20f Part (that overlaps with joint portion insulating member)
20b Part (that does not overlap with the joint portion insulating member)
21, 321, 421 Second insulating member (joint portion insulating member)
21a, 121a, 221a Facing surface insulating part 21b, 121b, 221b circumferential surface insulating part
30, 130 Coil portion
40, 140 Segment conductor
70, 170 First conductor (first segment conductor)
80, 180 Second conductor (second segment conductor)
90 Joint portion
90a, 190a Facing surface
90b, 190b Circumferential surface
100, 200, 300 Stator (armature)
121, 221 Insulating member (joint portion insulating member)
121c, 221c Contact portion insulation part (joint portion insulating part)
122, 222 Core leg portion insulating part
122a, 222a One side insulating part
122b, 222b Other side insulating part
122c, 222c Inner radial side insulating part
122d, 222d Outer radial side insulating part
123a Insulating layer (fourth insulating layer)
123b Fixing layer (fourth fixing layer)
123c Foaming layer (fourth foaming layer)
124a Insulating layer (third insulating layer)
124b Fixing layer (third fixing layer)
124c Foaming layer (third foaming layer)
140b Conductor surface (metal surface)
171 First leg portion
181 Second leg portion
190 Contact portion (joint portion)
223a Insulating layer (second insulating layer)
223b Fixing layer (second fixing layer)
223c Foaming agent (second foaming agent)
224a Insulating layer (first insulating layer)
224b Fixing layer (first fixing layer)
224c Foaming agent (first foaming agent)
230a End portion (end portion on outer radial side of coil portion)
230b End portion (end portion on inner radial side of coil portion)
L22 Length (length of joint portion insulation part and core leg portion insulation part)
L62 Length (slot length)

The invention claimed is:

1. An armature comprising:
an armature core provided with a plurality of slots extending in a central axis direction; and
a coil portion that includes a plurality of first segment conductors disposed on one side of the armature core in the central axis direction, and a plurality of second segment conductors disposed on another side of the armature core in the central axis direction so as to face the first segment conductors in the central axis direction, and
that is formed by joining the plurality of first segment conductors and the plurality of second segment conductors, in one slot of the slots or on an outer side of the one slot in the central axis direction; and
a joint portion insulating member that has a sheet shape and that insulates joint portions in which the first segment conductor and the second segment conductor are joined between coils adjacent to each other in a radial direction in the one slot, wherein
the joint portion insulating member includes at least two or more facing surface insulating parts that cover facing surfaces of the joint portions being radially adjacent to each other, and a circumferential surface insulating part that is continuous from both end portions of the facing surface insulating parts in a circumferential direction and that covers one circumferential surface of the joint portions adjacent in the radial direction for at least a predetermined distance along the radial direction, and
the facing surface insulating parts adjacent in the radial direction are connected by the circumferential surface insulating part in one or another circumferential direction, and
the joint portion insulating member is on the one circumferential surface and not both circumferential surfaces of the joint portions.

2. The armature according to claim 1, wherein the joint portion insulating member is configured so that the following are continuous:
the facing surface insulating part on an outer radial side among a pair of the facing surface insulating parts disposed adjacent to each other in the radial direction;
the circumferential surface insulating part provided on one side in the circumferential direction;
the facing surface insulating part on an inner radial side among the pair of facing surface insulating parts;
and the circumferential surface insulating part provided on another side in the circumferential direction.

3. The armature according to claim 2, wherein the joint portion insulating member is formed by folding one insulating member having a sheet shape.

4. The armature according to claim 1, wherein
the joint portion in which the first segment conductor and the second segment conductor are joined is disposed in the slot on one end portion side with respect to a center of the armature core in the central axis direction, and
a plurality of the joint portions is configured so that the joint portions overlap with each other when viewed in the radial direction.

5. The armature according to claim 4, wherein the joint portion insulating member is disposed so that an edge portion on one side in the central axis direction protrudes outward from an end surface of the armature core in the central axis direction.

6. The armature according to claim 5, further comprising a core leg portion insulating member that has a sheet shape and that is provided between the slot and the coil portion, wherein
both the joint portion insulating member and the core leg portion insulating member are disposed so as to protrude outward from the end surface of the armature core in the central axis direction.

7. The armature according to claim 6, wherein a length of the joint portion insulating member is smaller than a length of the core leg portion insulating member in the central axis direction.

8. The armature according to claim 6, wherein
the core leg portion insulating member includes a part that overlaps with the joint portion insulating member and a part that does not overlap with the joint portion insulating member when viewed from the radial direction, and
a thickness of the part of the core leg portion insulating member that overlaps with the joint portion insulating member is smaller than a thickness of the part of the core leg portion insulating member that does not overlap with the joint portion insulating member.

9. The armature according to claim 1, wherein the circumferential surface insulating part is provided so as to cover one of the circumferential surfaces of the joint portions adjacent in the radial direction for at least an insulation distance serving as the predetermined distance along the radial direction.

10. The armature according to claim 1, wherein the facing surface insulating part of the joint portion insulating member is provided so as to overlap with an entire surface of the facing surface of the joint portion when viewed in the radial direction.

11. The armature according to claim 1, wherein the circumferential surface insulating part of the joint portion insulating member is provided so as to overlap with the circumferential surface of the joint portion when viewed in the circumferential direction.

12. An armature comprising:
an armature core provided with a plurality of slots extending in a central axis direction; and
a coil portion that includes a plurality of first segment conductors disposed on one side of the armature core in the central axis direction, and a plurality of second segment conductors disposed on another side of the armature core in the central axis direction so as to face the first segment conductors in the central axis direction, and
that is formed by joining the plurality of first segment conductors and the plurality of second segment conductors, in one slot of the slots or on an outer side of the one slot in the central axis direction; and
a joint portion insulating member that has a sheet shape and that insulates joint portions in which the first segment conductor and the second segment conductor are joined between coils adjacent to each other in a radial direction in the one slot, wherein
the joint portion insulating member includes a facing surface insulating part that covers facing surfaces of the joint portions being radially adjacent to each other, and a circumferential surface insulating part that is continuous from both end portions of the facing surface insulating part in a circumferential direction and that covers one circumferential surface of the joint portions adjacent in the radial direction for at least an insulation distance, and the facing surface insulating parts adjacent in the radial direction are connected by the circumferential surface insulating part in one or another circumferential direction, and
the joint portion insulating member is on the one circumferential surface and not both circumferential surfaces of the joint portions.

* * * * *